(12) United States Patent
Harriman

(10) Patent No.: US 10,423,552 B2
(45) Date of Patent: Sep. 24, 2019

(54) INTEGRATED COMPONENT INTERCONNECT

(71) Applicant: Intel Corporation, Santa Clara, CA (US)

(72) Inventor: David J. Harriman, Portland, OR (US)

(73) Assignee: Intel Corporation, Santa Clara, CA (US)

(*) Notice: Subject to any disclaimer, the term of this patent is extended or adjusted under 35 U.S.C. 154(b) by 310 days.

(21) Appl. No.: 15/038,582

(22) PCT Filed: Dec. 23, 2013

(86) PCT No.: PCT/US2013/077512
§ 371 (c)(1),
(2) Date: May 23, 2016

(87) PCT Pub. No.: WO2015/099660
PCT Pub. Date: Jul. 2, 2015

(65) Prior Publication Data
US 2016/0299860 A1 Oct. 13, 2016

(51) Int. Cl.
*G06F 13/36* (2006.01)
*G06F 15/177* (2006.01)
*G06F 13/40* (2006.01)
*G06F 13/42* (2006.01)

(52) U.S. Cl.
CPC .......... *G06F 13/36* (2013.01); *G06F 13/4063* (2013.01); *G06F 13/4068* (2013.01); *G06F 13/4282* (2013.01); *G06F 2213/0026* (2013.01); *G06F 2213/0038* (2013.01)

(58) Field of Classification Search
None
See application file for complete search history.

(56) References Cited

U.S. PATENT DOCUMENTS

2003/0204830 A1* 10/2003 Brawn ................... G06F 9/4411 326/38
2004/0236534 A1 11/2004 Wheless et al.
2005/0246478 A1* 11/2005 Tanaka .................. G06F 9/4411 710/315

(Continued)

FOREIGN PATENT DOCUMENTS

CN 1449526 A 10/2003
JP 2002149627 A 5/2002

(Continued)

OTHER PUBLICATIONS

International Preliminary Report on Patentability and Written Opinion in International Application No. PCT/US2013/077512 dated Jun. 28, 2016.

(Continued)

*Primary Examiner* — Ilwoo Park
(74) *Attorney, Agent, or Firm* — Alliance IP, LLC

(57) ABSTRACT

A data structure is accessed that defines configuration parameters of one or more integrated blocks in an integrated circuit device. One or more of the integrated blocks is configured based on corresponding configuration parameters defined in the data structure. The configuration parameters are set prior to runtime and are to be persistently stored in the data structure.

21 Claims, 17 Drawing Sheets

(56) References Cited

U.S. PATENT DOCUMENTS

| | | | |
|---|---|---|---|
| 2007/0283059 A1* | 12/2007 | Ho ................... | G06F 13/102 |
| | | | 710/104 |
| 2007/0294444 A1* | 12/2007 | Panesar ............ | G06F 13/4221 |
| | | | 710/104 |
| 2008/0052440 A1 | 2/2008 | Horowitz et al. | |
| 2009/0070493 A1 | 3/2009 | Riocreux | |
| 2010/0043012 A1 | 2/2010 | Du et al. | |
| 2011/0093741 A1* | 4/2011 | Liang ................ | G06F 11/1417 |
| | | | 714/6.1 |
| 2013/0138845 A1 | 5/2013 | Hill et al. | |

FOREIGN PATENT DOCUMENTS

| | | |
|---|---|---|
| JP | 2011527097 A | 10/2011 |
| TW | 200951730 A | 12/2009 |
| WO | WO2015/099660 | 7/2015 |

OTHER PUBLICATIONS

Japanese Patent Office Non Final Notice of Reasons for Rejection in Japanese Patent Application No. 2016-532131 dated Jun. 19, 2017, 12 pages.

Compaq Computer Corporation et al. "Plug and Play BIOS Specification", http://download.intel.com/support/motherboards/desktop/sb/pnpbiosspecificationv10a.pdf, May 5, 1994, 56 pages.

EESR Notice of Extended European Search Report issued in EP Patent Application No. 13900423.8 dated Jul. 17, 2017 (6 pages).

JPO Notification of Reasons for Refusal issued in JP Patent Application No. 2016-532131 dated Oct. 30, 2017 (2 pages) with English translation (3 pages).

KIPO Notice of preliminary Rejection issued in KR Patent Application No. 2016-7013464 dated Nov. 15, 2018 (4 pages) with English translation (3 pages).

SIPO Notice of First Office Action CN Patent Application No. 201380081348.1 dated Mar. 16, 2018 (10 pages).

KIPO Notice of Allowance issued in KR Patent Application No. 10-2016-7013464 dated May 28, 2018, (2 pages) with English translation (1 pages).

Notice of Allowance for Japanese Patent Application No. JP2016532131, dated Feb. 14, 2018, 1 page—English Translation not Available.

SIPO; Second Office Action and Search Report for Chinese Patent Application No. CN201380081348.1, dated Oct. 25, 2018, 4 pages—English Translation Not Available.

SIPO; Third Office Action issued for CN Patent Application No. 201380081348.1, dated Mar. 14, 2019; 3 pages, no English translation available.

International Search Report and Written Opinion in International Application No. PCT/US2013/077512 dated Sep. 23, 2014.

* cited by examiner

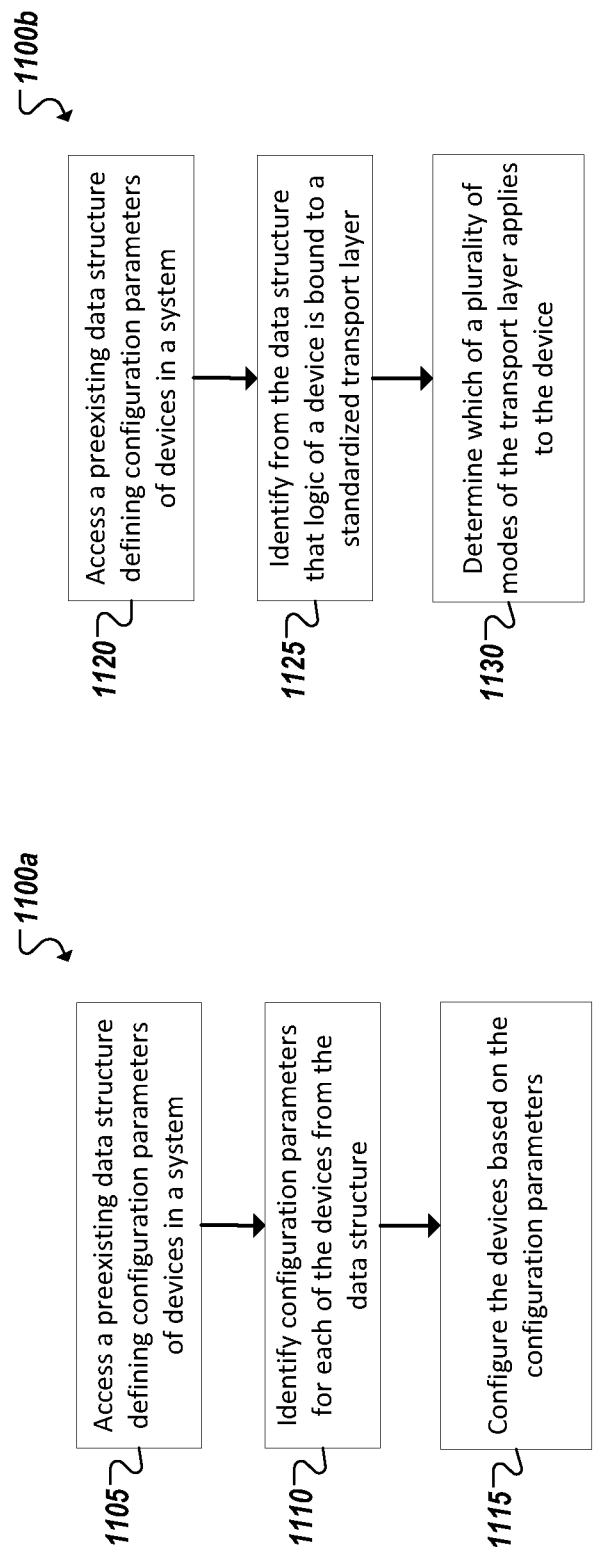

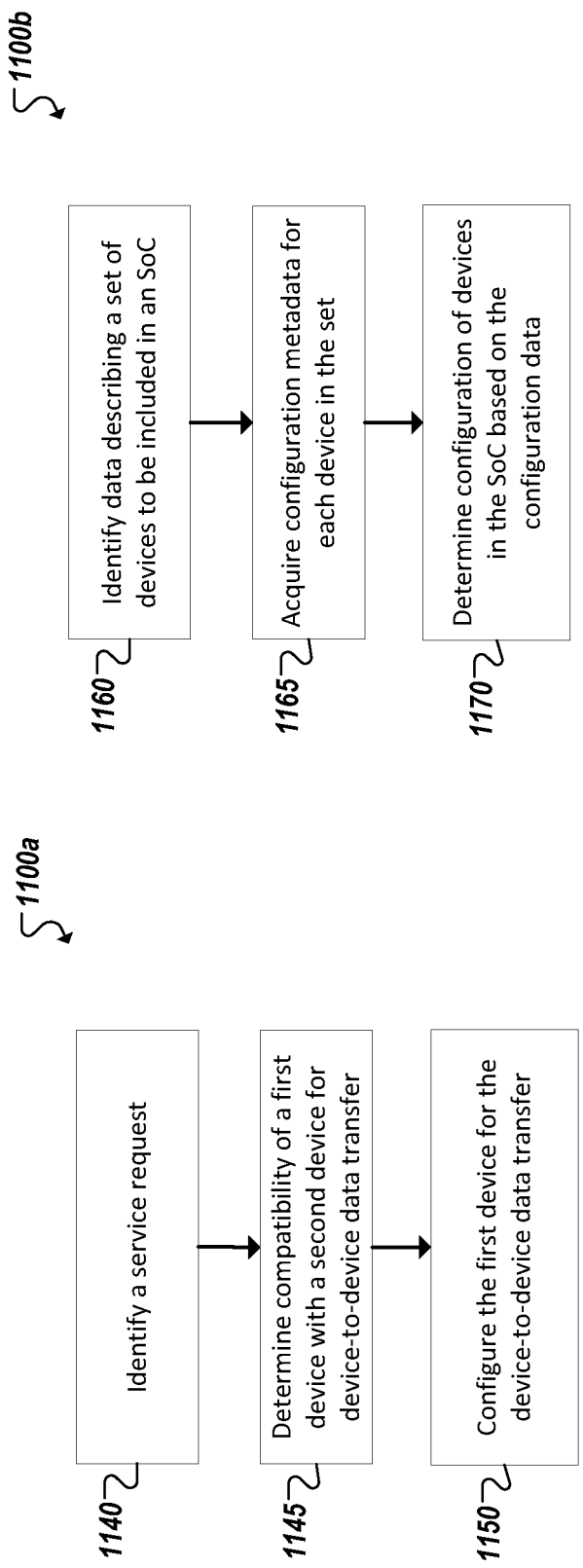

INTEGRATED COMPONENT INTERCONNECT

This application is a national stage application under 35 U.S.C. § 371 of PCT International Application Serial No. PCT/US2013/077512, filed on Dec. 23, 2013 and entitled "INTEGRATED COMPONENT INTERCONNECT", which application is considered part of and is hereby incorporated by reference in its entirely in the disclosure of this application.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 11A-11D are flowcharts illustrating example techniques that can be employed in system on chip (SoC) architectures and other systems.

DETAILED DESCRIPTION

Figure 1:
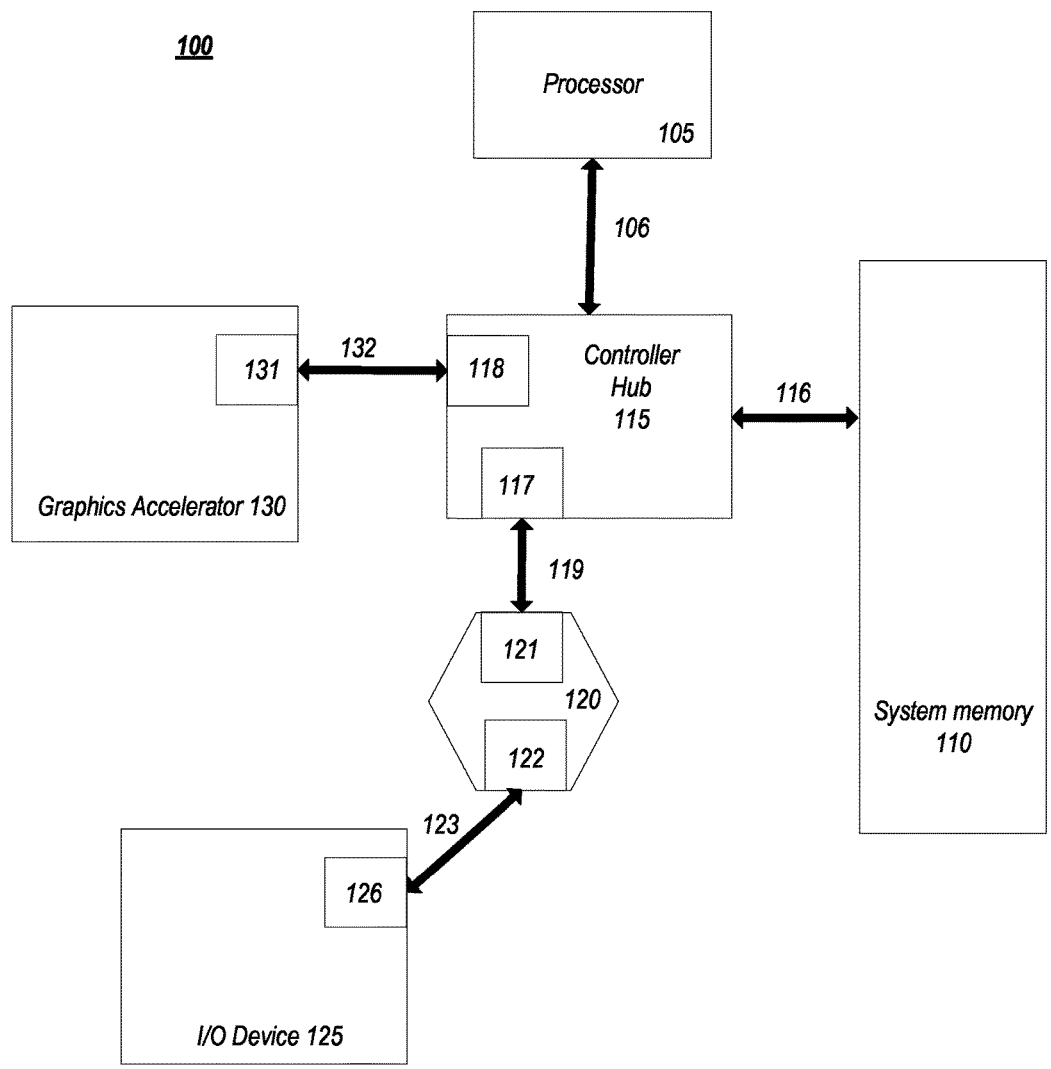
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
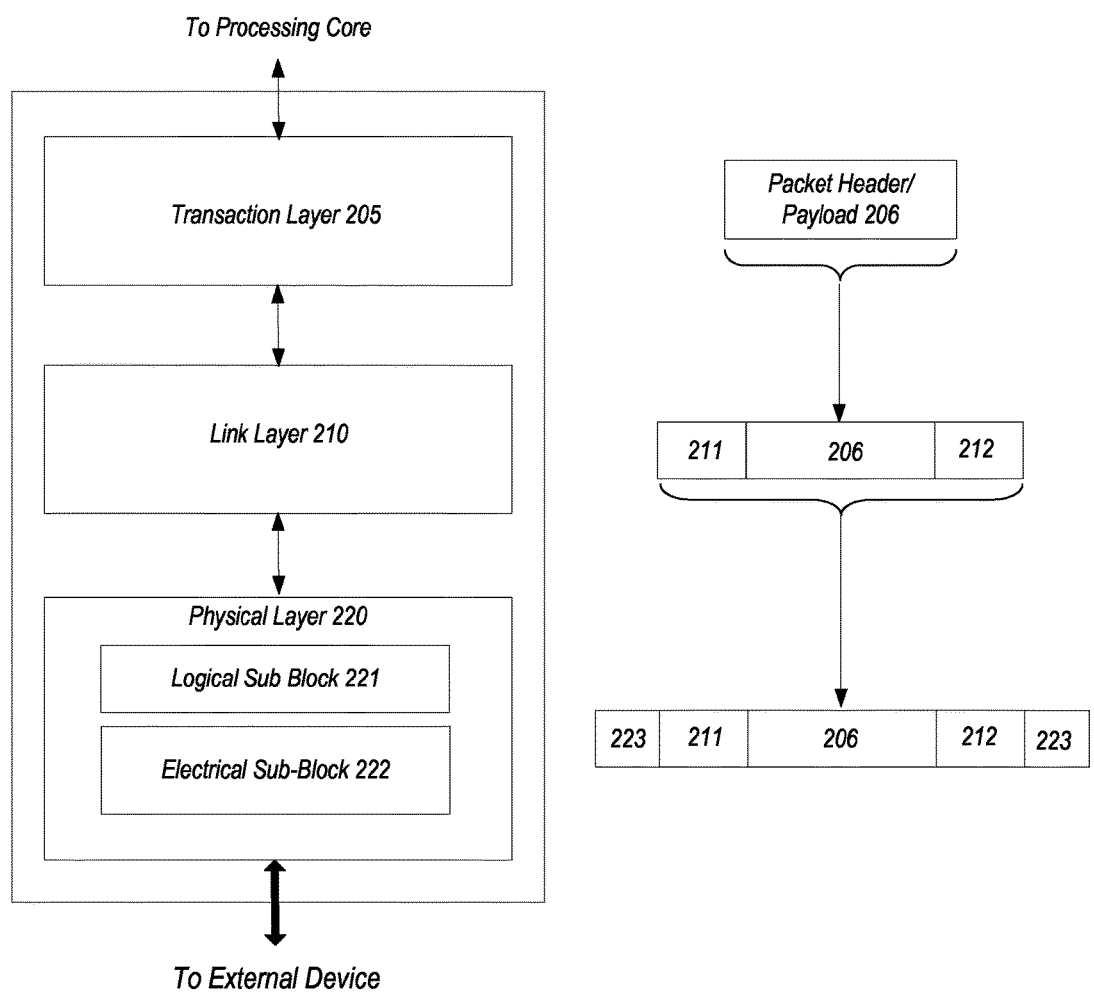
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
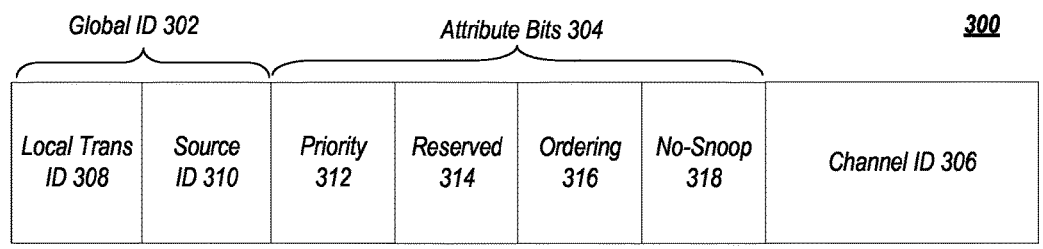
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
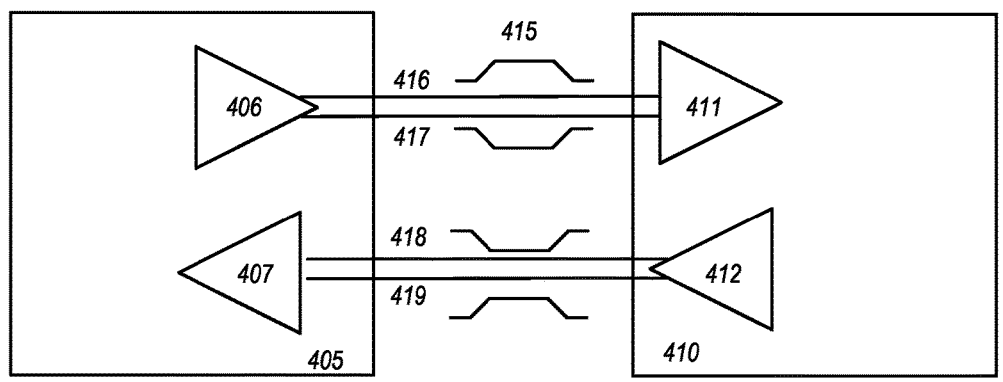
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Traditional interconnect architectures, including PCI and PCIe were developed and standardized largely around the paradigm of traditional computing devices, such as personal computers (PCs), where chip-to-chip connections, plug and play, and componentized architectures were the norm. Newer technologies have emphasized smaller, more mobile computing, with smart phones, netbooks, laptops, and tablets complimenting desktop computers within the marketplace. Given the decreasing size and compact form factors of mobile computing devices, personal computers have become less modular. Where in the past it was relatively common to replace graphics cards, memory, and other components, accessing or upgrading the components of a smart phone, tablet, or other such device is uncommon. Indeed, in some markets, the expectation is that when an upgrade is needed, the owner trades-in or otherwise replaces a previous device with an entirely new device, where in years past, the owner may have tried to extend the lifespan of the device by upgrading individual components. In many modern systems, computing hardware is migrating from a modular model to an integrated one, with multiple components being integrated on a single board, or a system on chip (SoC).

Some believe that the trend toward integration is likely to make traditional I/O technologies obsolete, including existing interconnect architectures, as the purpose of I/O technology development shifts from enabling chip-to-chip connections towards enabling SoC intellectual property (IP) block integration. This disclosure describes mechanisms that build upon principles of trusted and established interconnect architectures through improvements that can provide meaningful value through shorter product cycles, more silicon application flexibility, reduced cost, reduced power and improved user experience. Such improved I/O solutions can be optimized to not only tablets, phones, and other low cost embedded platforms, but also to current and next generation PCs, among other examples.

PCI and PCIe have been ubiquitously deployed as the local I/O architecture of PCs (e.g., chip-to-chip within a chassis). Also, most integrated functions, such as provided through a platform control hub (PCH), I/O controller hub (ICH), or other hub device used in conjunction with a platform CPI, are visible to system software as PCI or PCIe Functions. Alternative and competing load/store architectures lack many of the features and refinement of PCI/PCIe, make different fundamental operating assumptions (e.g. regarding transaction ordering rules), and have developed to target other computing platforms, and as a result, using blocks developed for these platforms in PC-type platforms can incur significant additional hardware and software costs.

Load/store has been regarded as the "native language" of CPUs, leading to an environment where load/store I/O architectures, such as PCI/PCIe, play a foundational role in modern computing. For instance, controller-based I/O technologies (e.g. USB, SATA, UniPro) can interface their controllers to the CPU using load/store I/O. By providing a direct low-level interface to the CPU, load/store I/O can provide flexibility and performance benefits over controller-based I/O. This flexibility is especially attractive to enable technology transitions, such as with storage today, because there are fewer dependencies to enable new features and capabilities.

The disclosure, features, components, and examples detailed below can address at least some of these issues, among other examples. Specifically, a grouping of improvements are detailed that can build upon principles of existing interconnect architectures, including the specifications of PCI and PCIe. In one example implementations, a Highly Integrated PCI (HIPCI) architecture is proposed that can include one or more of the following capabilities: (1) instant device configuration that can eliminate the use of program registers at run time for identifying static device configuration values; (2) a hardware/software architecture to allow a layered driver model with basic transport services layer (e.g., built upon at least a portion of established PCI and/or PCIe functionality and protocols and providing the same as a service) supported through direct operating system (OS) support, including software bridging to allow use together with other protocol classes, such as Universal Serial Bus (USB) Class stacks; (3) a framework for direct device-to-device communication without system memory buffering; (4) optimized IP block interfaces for SoC and multichip package (MCP) IP block integration, among potentially other features and functionality. These and other features, and the principles thereof, can be adopted in whole or in part and can be adopted independently of others. Further, while many of the examples herein discuss these features within the context or application of an SoC, it should be appreciated that applications of these features can be just as appropriately employed in connection with other systems and components, such as, for example, PCH, ICH, I/O hub (IOH), or even single function components, among other examples.

Figure 5:
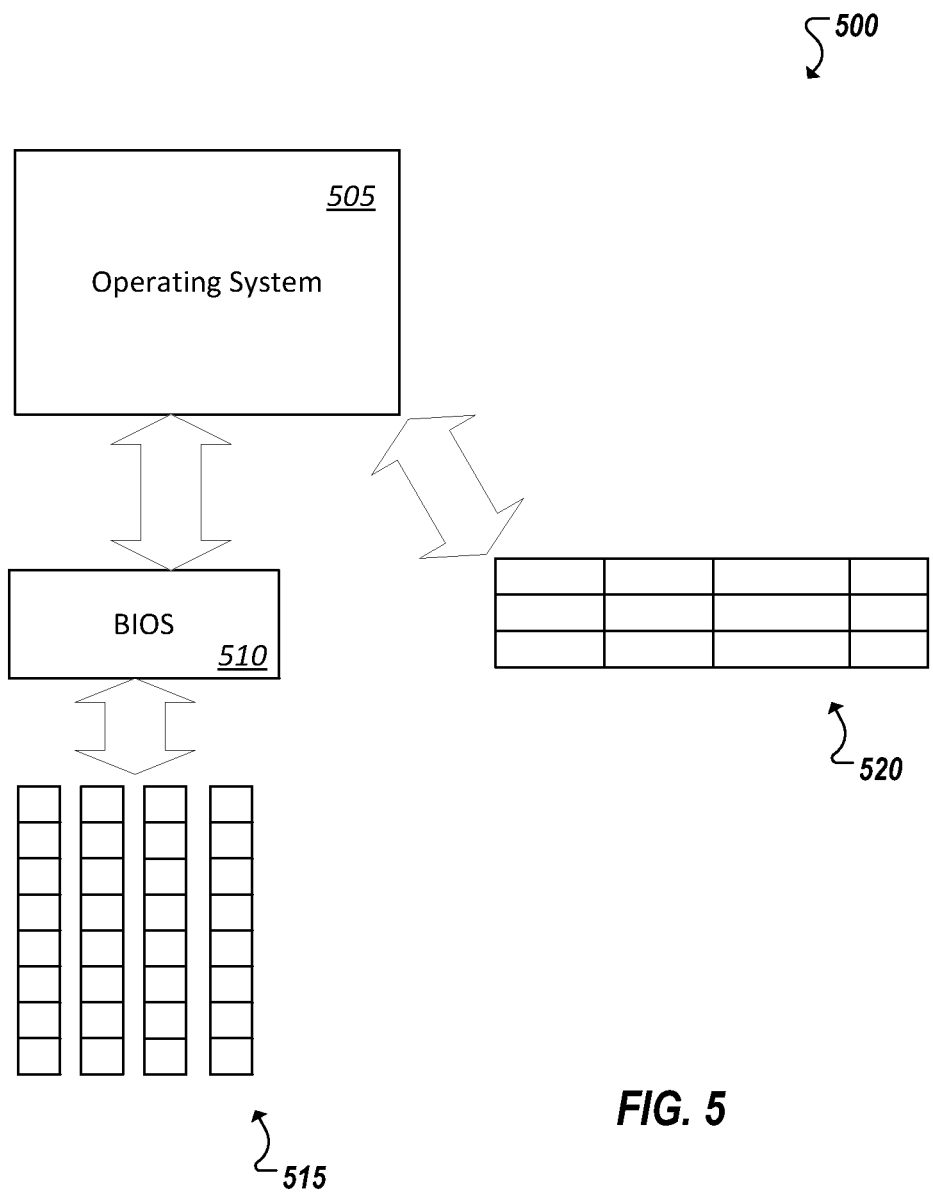
FIG. 5 illustrates a simplified representation of an example configuration attribute data structure in an example system.

FIG. 5 is a simplified block diagram 500 of a system including an operating system of a computing system employing multiple integrated devices, such as an SoC including multiple IP blocks (also referred to herein as system blocks, integrated blocks, or, simply, blocks). The computing system can include an operating system 505 adapted to configure the devices on the system. A Basic I/O System (BIOS) 510 can be provided that can initialize and test system hardware components. Configuration information for the various devices can be stored in registers 515 of the devices. The BIOS can read the registers at run time (e.g., at boot up) and pass information to the OS. In some implementations, a machine readable instant configuration data structure 520 can additionally be provided from which all or a portion of the configuration information of system devices can be stored to be directly read and accessed by the OS 505 to configure the system hardware. In some instances, data structure 520 can wholly or partially replace registers 515, allowing register space to be reduced, compacted, or otherwise optimized through the delegation of some configuration activities to software.

Many IP blocks intended for phone/tablet and other embedded systems lack self-discovery/configuration "plug and play" mechanisms. Such mechanisms were originally developed to allow system self-configuration when a user modified the hardware configuration, such as by adding/removing PCI/PCIe add-in cards, plugging in a USB device, among other examples. While self-configuration can appear to be of limited utility for logical blocks integrated within a system (e.g., that cannot be removed or replaced), some of the benefits of "plug and play" configuration can nonetheless be lost, such as the structure provided through architectures providing such features. For instance, without such structure, there can be an added burden to developers and operating system and virtualization vendors as the matrix of possible system/device configurations grows unmanageably large and varies from one vendor to another. In such instances, even simple aspects of device configuration may differ from one block to another, further complicating design, build, and configuration of such systems.

In an improved system, discovery and configuration of hardware can be at least partially shifted from runtime to build time. For instance, static attributes of devices included within an SOC can be identified at design time and described in data persistently stored in a machine readable data structure (e.g., 520) directly accessible by an OS (or hub controller). Such attributes can be effectively, instantly identified, or configured, by the OS. All or portions of capability registers, such as PCI/PCIe capability registers, can be redefined as device (e.g., IP block) metadata stored in an instant configuration data structure. Such metadata structures (e.g., 520) can include, for instance, information traditionally stored in configuration registers that is not modified after boot. In some implementations, the data structure can be an XML or other machine-readable data file.

In some implementations, IP block metadata can be utilized at design time of the system. The metadata can be configured for use by computer aided design (CAD) or other tools utilized in SOC (or other systems') design. Such tools can be provided that can read the metadata and automatically configure interconnect fabrics and other blocks based on IP block information included in the metadata. Tools can further utilize the information in the IP block metadata to integrate a set of desired IP blocks into an SoC, MCP, etc.

Use of instant configuration metadata (e.g., through data structure 520) can allow runtime device configuration to be reduced. Such structures (e.g., 520) can be stored in main system memory. Further, in some implementations, status registers and configuration registers used at run time can remain unchanged, or can be optimized, for instance to improve the density of field packing Alternately, the mechanisms for working with these can be modified, for example, to operate through data structures in main memory rather than through configuration registers. An integrated system can be assumed to have a fixed set of devices (e.g., IP blocks). During design of the integrated system, certain attributes and configurations of the devices can be presumed to be static. Static attributes for the collection of integrated devices can be described in IP block metadata and stored in one or more data structures that are accessible at the software level. Additionally, in some implementation, some of the "static" attributes can be redefined at the software level, for instance, by system firmware (e.g., system BIOS or other firmware) or the operating system, by modifying metadata values corresponding to the static attribute. For example, system firmware might modify the metadata values stored in system memory prior to handing off control to an operating system by writing alternate values within the metadata structures, or by substituting alternate metadata structures, for example, by providing an alternate memory pointer to the operating system.

In some instances, metadata describing static attributes of a particular IP block can be obtained from various sources that provide such metadata according to a defined schema (e.g., such that the metadata is compatible with tools used in design time and/or an operating system of the integrated system, etc.). In one example, at design time, the respective attributes of multiple different IP blocks to be integrated in an SoC can be identified or configured. For example, attributes that might be identified include a Vendor ID, a Device ID, and/or a Class Code such as those defined by PCI. Other attributes that might be configured include resource allocations such as memory mapped IO spaces, interrupt vectors, and/or attributes of the IP block itself, such as the respective maximum payload size (MAX_PAYLOAD_SIZE) supported by each IP block. The respective MAX_PAYLOAD_SIZE can be defined in metadata and stored in a data structure accessed by the operating system to configure hardware of its system. In one example, an application can request a service that involves the exchange of data between two devices with incompatible MAX_PAYLOAD_SIZE attributes defined in metadata. The operating system can disallow the service as illegal, in some instances, based on the incompatibility. In other instances, the operating system can temporarily modify the MAX_PAYLOAD_SIZE of one of the devices such that the requested service is allowed. In some implementations, the data structure can include links to register values. In some instances, values and changes made to the instant configuration data structure can be caused to be automatically reflected at the register level (e.g., based on the links). In some implementations, a defined metadata schema can be defined and the definition can map corresponding registers to the schema (and values in described in the schema). Additionally, validation of the metadata can be performed, for instance, to check that the metadata is properly formatted, conforms to a corresponding protocol specification, and describes a configuration or block that is suitable for use in a specific context, such as, whether the MAX_PAYLOAD_SIZE or another example attribute makes the block suitable for one or more particular uses within the system, among other examples.

Figure 6:
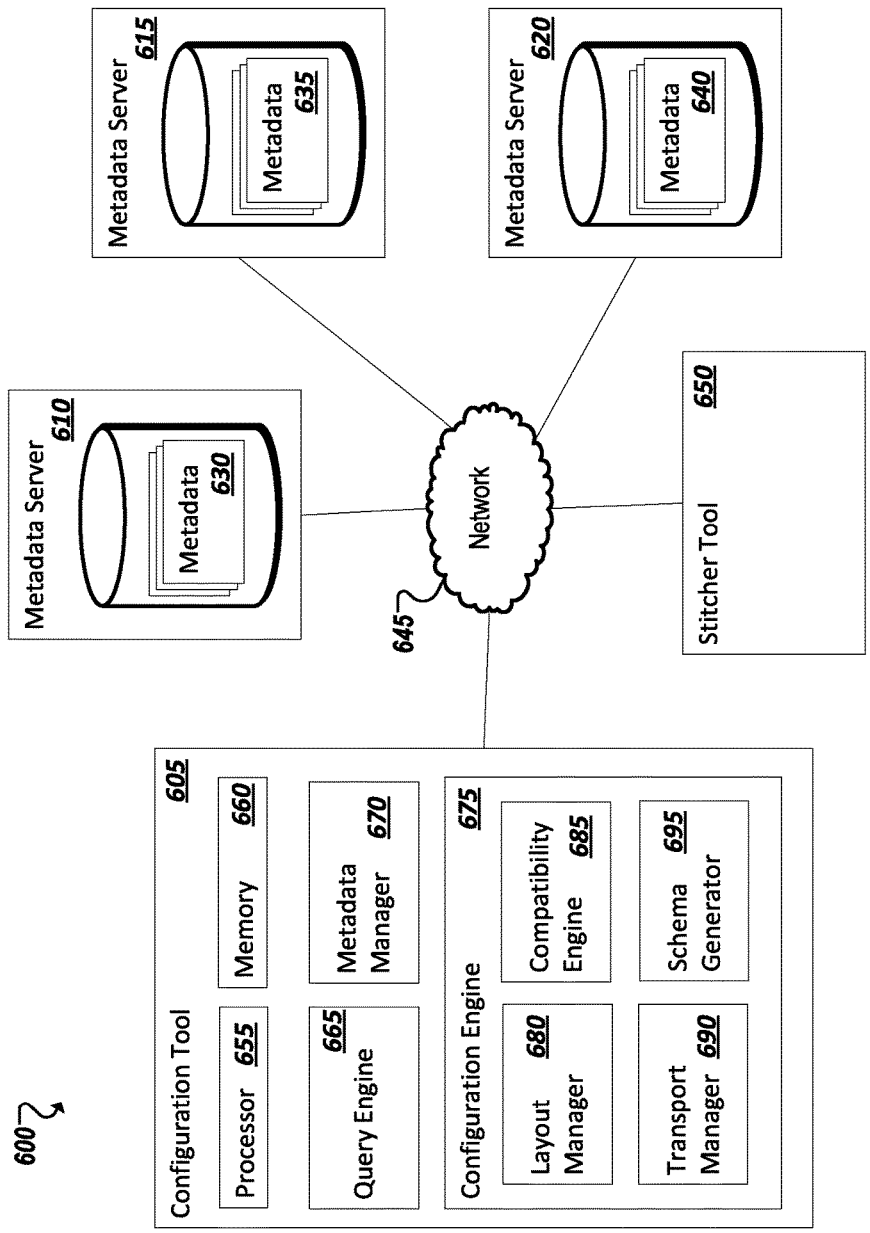
FIG. 6 is a simplified block diagram of an example system including a configuration tool.

Turning to FIG. 6, a simplified block diagram 600 is shown illustrating an example system for generating and using instant configuration metadata, according to some example embodiments. In the particular example of FIG. 6, an example configuration tool 605 is provided that can interact with metadata servers or sources (e.g., 610, 615, 620) hosting IP block metadata 630, 635, 640. Configuration tool 605 can obtain the metadata (e.g., 630, 635, 640) by interfacing with metadata sources (e.g., 610, 615, 620) over one or more networks 645, such as private or public network(s) (including the Internet). Other tools can make use of IP block metadata or other configuration data generated from the metadata (e.g., by configuration tool 605) such as a stitcher tool 650, CAD tool, or other system design tool. Such tools can include functionality for using metadata or other data describing IP blocks and a communication fabric to combine the multiple IP blocks and on-die communication fabric to enable the IP blocks to interoperate. Such tools can also be used, in some implementations, to combine or integrate any software logic specific to the IP blocks into the system firmware/software (e.g., operating system), to tailor the system software to the specific IP blocks and/or communication fabric designed using the tools, among other examples.

In one example, configuration tool 605 can include one or more data processor devices 655, one or more memory elements 660, and one or more other software and/or hardware-based components, such as query engine 665, metadata manager 670, configuration engine 675, among potentially other examples (such as components combining functionality of the example components described herein). A query engine 665 can include logic to identify a respective source of metadata (e.g., 610, 615, 620) for each one of a plurality of IP blocks identified to the configuration tool 605. In some instances, a grouping of IP blocks can be specified (such as a particular grouping of IP blocks selected by engineers for inclusion in an SoC or MCP). In some examples, metadata (e.g., 630, 635, 640) provided by one or more sources (e.g., 610, 615, 620) can be standardized according to a particular schema (e.g., according to a uniform XML template). The metadata (e.g., 630, 635, 640) of each IP block can describe the attributes of the IP block and format the description according to the defined schema. In some instances, a metadata source can correspond to a manufacturer, vendor, or other organization associated with the particular IP block. Upon identifying the source, query engine 665 can query the source for metadata for the corresponding IP block. A metadata engine 670 can manage the querying and acquisition of the IP block metadata for each of the grouping of IP blocks. Upon acquiring a set of IP block metadata for the specified grouping of IP blocks, the metadata engine can make the set of metadata available, for instance, to a configuration engine 675.

In one example, configuration engine 675 can include logic for determining how to integrate and configure a set of IP blocks within a system, such as an SoC. The logic of configuration engine 675 can accept, as input, the set of IP block metadata for the IP blocks to be integrated in a proposed system and, automatically, without human direction, determine a proposed layout and configuration for the set of IP blocks. This can include determining a layout (or layout constraints) of the IP blocks on a die, timing constraints, compatibility between IP blocks, capabilities of the various blocks, transports supported by the various blocks, drivers of the IP blocks, clock frequency, a number of gates to provide in the system, the types and amount of system resources to allocate to each IP block, among other examples. Sublogic of configuration engine 675 can perform various checks and analyses on the metadata describing attributes of the various IP blocks, such as layout manager 680, compatibility engine 685, capability manager 690, among other examples. Configuration engine 675 can generate configuration data, for instance, using schema generator 695 to describe the configuration information determined for a system including the set of IP blocks described by the acquired IP block metadata.

In some implementations, configuration data generated, for instance, by configuration engine 675 can be consumed by a stitching tool 650 to generate a model of the SoC and SoC fabric that can be manufactured to embody the system configuration determined by configuration engine 675 and described in the configuration data. While in some instances, system designers may design a system around the OS that is to run on the system, in some implementations, a stitcher tool (e.g., 650) or other tool can further utilize configuration data to generate an outline of the configurations of the system incorporating a particular grouping of IP blocks. OS designers can thereby tailor the OS to the design-time specification of the system determined by configuration engine 675 and described in configuration data generated by configuration engine, among other examples. Indeed, in some implementations, functionality of configuration tool 605 and stitcher tool 650 can be combined, among other examples.

In some examples, to enhance the usability of IP block metadata mechanisms, each IP block or device can be assigned a unique identifier and metadata describing a corresponding IP block or device (and the source of the metadata) can be mapped to the unique identifier (effectively a Vendor ID/Device ID combination).

In some implementations, in addition to the hardware configuration aspects, similar CAD mechanisms can be created to automatically generate the needed firmware/software settings and drivers to optimally operate the hardware present in the given platform. For example, the Linux kernel configuration parameters can be generated automatically to include the drivers required for exactly the blocks integrated in a system (and described by a corresponding set of metadata).

Configuration metadata can be used to improve IP integration automation. A common interface definition, combined with the mechanisms of instant configuration (enabled through a data record based on metadata of the aggregate components of a system), can enable a high degree of automation for SoC integration of IP blocks from different sources. As noted above, a uniform template can be defined for metadata that is used for SoC integration in a machine readable format (e.g. XML). For example, through the use of a common signal interface, vendor-neutral compliance and interoperability mechanisms can be established, the results of which can be published as metadata associated with the evaluated IP block, and fed into the stitching tool to contribute to an overall confidence metric for the integrated SoC. Inclusion of blocks with incomplete or failing test results can be flagged unless the tool can determine, e.g. using the configuration information established through instant configuration, that specific problematic cases or limitations of a particular IP block will not affect the functionality or performance of the SoC as integrated. As an example, it can be determined that the limitations of a specific IP block's MAX_PAYLOAD_SIZE will not limit the functionality or performance of a proposed SoC (including the IP block) as a whole. In addition to the aspects described above, tools can be provided that can establish consistent SoC equivalents for latency management (e.g. LTR) and alignment of activity within the platform (e.g. OBFF), and provide simulation and validation tools, and test suites to establish and maintain consistent implementation, among other examples.

Figure 7:
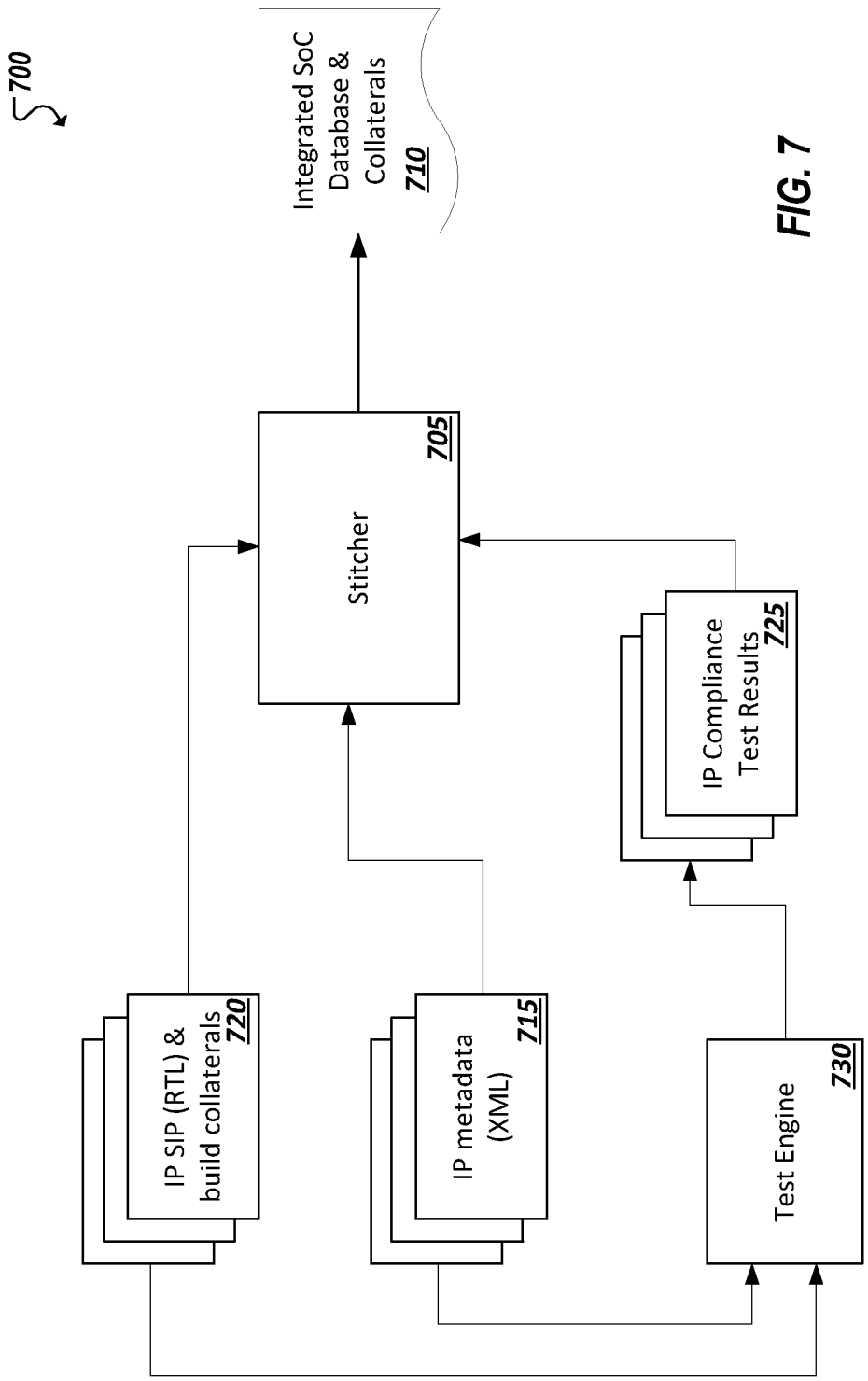
FIG. 7 is a block diagram illustrating an example flow in the generation of example configuration data.

Turning to FIG. 7, a simplified block diagram is shown of an example implementation of a stitcher 705 (or configuration tool) to generate configuration data 710 describing configuration of a system, such as an integrated system of a plurality of IP blocks. In this particular example, stitcher 705 generates data 710 including a database of IP block configuration information and collaterals (e.g., build collaterals for the IP blocks in the set). In one example, configuration data 710 can be generated from IP block metadata 715 specifying configuration attributes such as transport modes, capabilities, memory resource requirements, timing attributes, payload limitations, and other static, semi-static, or default attributes of a corresponding IP block. Build collateral data 720 can also be assessed at the stitcher for each IP block. Build collateral data can include, for instance, data describing "soft IP blocks" or IP blocks at the design stage. Build collaterals can be implemented using register transfer language (RTL) or another pre-silicon design language. In some implementations, build collateral data 720 can be included in IP block metadata. IP block compliance test result data 725 can also be consumed by stitcher 705 and describe the results of compatibility and compliance analyses of the IP blocks, including the level of interoperability and compatibility between the various IP blocks designated for inclusion in an SoC or MCP. Test or verification logic (e.g., of a test engine 730) can perform these verification, compatibility, and compliance tests on machine readable portions of IP metadata 715 and/or build collaterals 720 in order to generate test result data 725. With information concerning the capabilities, configuration parameters, and inter-block compatibility and functionality obtained from data 715, 720, 725, stitcher logic 705 can determine configuration attributes (e.g., layout configuration, clocking configuration, supported transports, interoperability configurations between IP blocks, etc.) for a system (such as an integrated system) and describe the results in machine readable configuration data 710. Configuration data 710 can include a substantially complete description of the corresponding SoC and its components, including RTL code, synthesis directives, constraints, and other information to synthesize to build the SoC, the OS source files that are specific to/appropriate for the SoC, test results, user documentation, among potentially other information. As noted in other examples above, configuration data 710 can be used, for instance, to guide designers of the system and the system OS, as well as form the basis of an instant configuration data structure (e.g., 520), among other potential uses.

As noted above, pre-silicon "soft" IP blocks can be embodied in data describing configuration and attributes of hardware-based "hard" IP blocks that can be implemented in silicon based on corresponding soft IP blocks. While soft IP blocks are to be distinguished from hard IP blocks within this context, it should be appreciated that discussion of features and uses of an "IP block" (i.e., when not specifically referred to as a "hard" or "soft" IP block) can apply to hard and/or soft IP blocks in some contexts.

Figure 8:
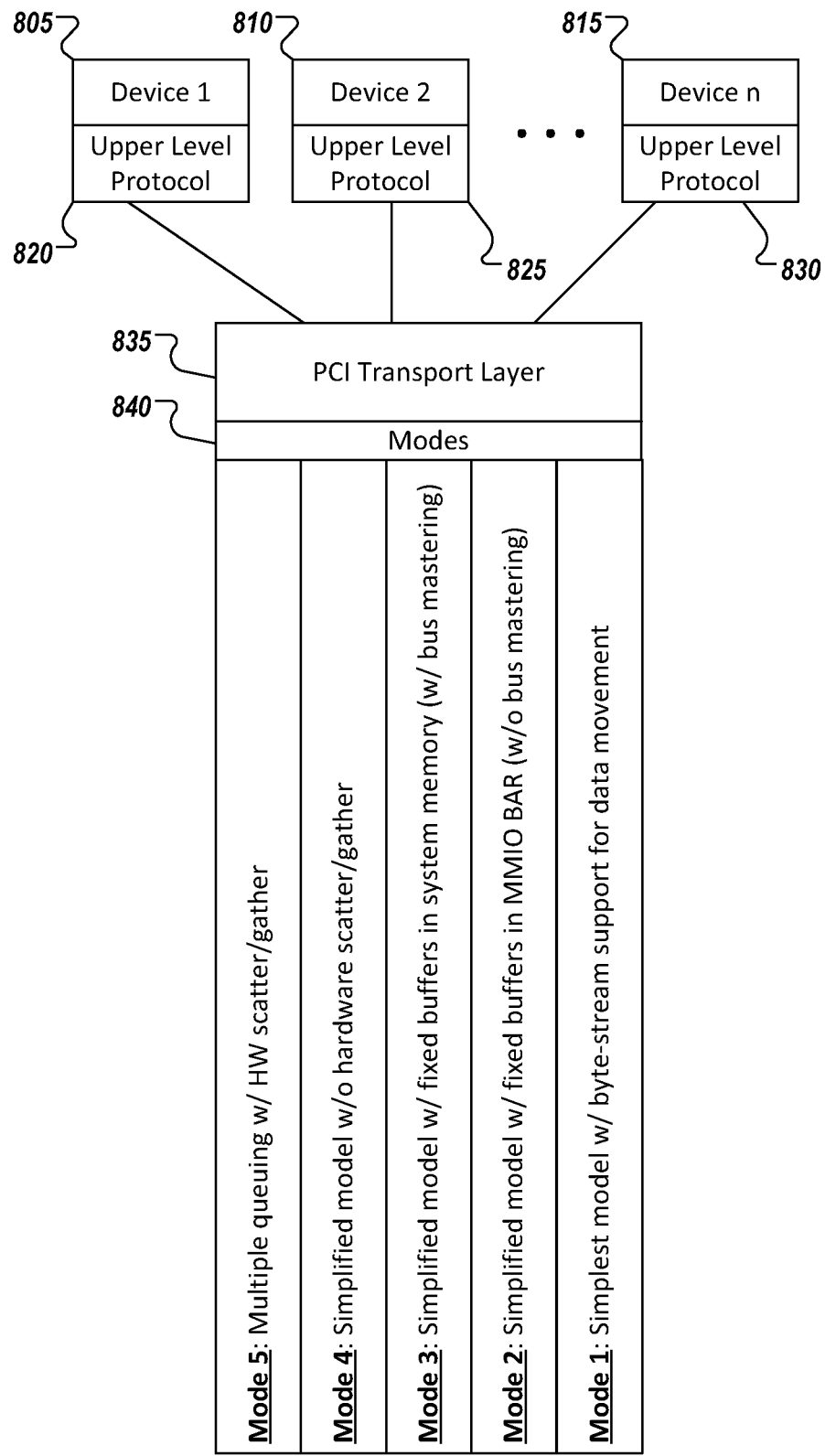
FIG. 8 is a simplified block diagram illustrating an example transport layer of a system.

Systems can be implemented that offer defined and trusted high-performance interconnect transport protocols and architectures, such as PCI and PCIe, as a service through a transport layer that can be leveraged by the driver or other upper layer logic of potentially any IP block for integration in a system. Traditional PCI can support specification-defined class driver software stacks, where a specific PCI/PCIe Class/SubClass/Programming Interface (PI) is defined at the register interface level for each specific device type. In an improved architecture, an explicitly defined layered model can be provided and supported on an improved PCI or PCIe platform where services, e.g. data transport, signaling, and device management applying at least a portion of the specification-defined principles and features of PCI or PCIe architectures are defined generically. As shown in FIG. 8, multiple devices (e.g., 805, 810, 815), such as IP blocks within an integrated system, can have IP block-specific drivers or other upper-level protocols and logic (e.g., 820, 825, 830) that can interface with and consume PCI/PCIe-based transport services provided through a defined PCI transport layer 835 made available to all devices (e.g., 805, 810, 815) in the system. For example, device-specific drivers can built on top of this PCI transport layer 835 foundation for each of the devices (e.g., 805, 810, 815).

In some implementations, drivers developed for the various devices in a system (e.g., an SoC) can be based upon a layered architecture that includes a defined, uniform PCI-based transport layer 835. Using such a defined transport layer can reduce system development costs as developers can build upon a time-tested transport architecture (e.g., PCI/PCIe), rather than building a new transport mechanism from scratch for a particular device. Time-to-market and platform robustness can be improved, with a uniform set of hardware mechanisms being established to simplify productization of hardware value-add features such as I/O virtualization enhancements and data movement engines, among other examples.

In some examples, such the one illustrated in FIG. 8, a PCI transport layer can include a set of defined modes 840. Each mode can provide a respective level of service that provides a set of defined PCI/PCIe transport features. Some component applications may make good use of PCI/PCIe performance-enhancing, efficiency-enhancing, or energy-saving functions and protocols, while others can be satisfied with more bare-boned versions of PCI/PCIe. Accordingly, multiple different modes can be packaged offering various levels of PCI/PCIe transport and corresponding features. For example, in one instance (such as that illustrated in FIG. 8), a highest mode ("Mode 5") is based on a robust PCI/PCIe transport model, such as a multiple queuing model that includes support for hardware scatter/gather functionality. Another mode, "Mode 4," offers a slightly more simplified PCI/PCIe transport model, such as a model similar to Mode 4 but without hardware scatter/gather. Additionally, a further simplified mode, "Mode 3," provides PCI/PCIe-based transport services according to a simplified model supporting and using fixed buffers in system memory and bus mastering. Another mode, "Mode 2" is further simplified, offering a simplified mode with fixed buffers (e.g., in memory-mapped I/O (MMIO) base address register (BAR) memory), but without bus mastering (e.g., the component is the target and not the sender). In the example of FIG. 8, the simplest mode offered through the example PCI transport layer modes is a "Mode 1" with no bus mastering and only byte stream support for data movement (e.g., using the x86 MOVS instruction for CPU directed data movement).

Each individual component in a system that provides a PCI transport layer can support one or multiple of the modes (e.g., 840) of the PCI transport layer. Further, some components may have a core or native transport (e.g., non-PCI/PCIe) that can be augmented by modes provided through the PCI transport layer. For instance, a USB device can send data in some selected instances, using a particular one of the modes provided through the PCI transport layer. Indeed, various modes of the PCI transport layer can be selectively used by a particular device (e.g., IP block), for instance, using one of the modes in some categories of transactions and another of the modes in other transactions.

In some implementations, "PCI Transport" is discovered by system software through a specific PCI Class Code (or Sub-Class or Programming Interface) identified for the device. For instance, one or more PCI Classes can be assigned to "PCI Transport" indicating that the Class includes hardware that supports the defined PCI Transport service. Each such Class can have sub-classes for each potential use of the PCI Transport. For instance, one sub-class can correspond to storage, another for networking, another for USB over PCI Transport, another for HID over PCI Transport, and so on. In some implementations, Class/Sub-Class/PI in PCI can apply to a specific Function, so for that Function one either uses PCI Transport or not, however a single hardware component can implement multiple Function interfaces, and so it could have one Function that uses PCI Transport, and another that does not (e.g., the second Function can bind to an existing device driver, say for WiFi). Further, the PCI sub class of the device can be used to identify which upper level protocol is to be bound above the PCI transport layer for the device. For instance, in one example, interprocess communication logic, a binding to an existing stack for Human Interface Devices (HID), or other upper level protocol can be bound above the PCI transport layer for a particular device. Further, in some examples, identifying the respective PCI Programming Interface (PI) of the device can be used to define which PCI transport layer mechanisms are used by the device, such as through a strict or informal mapping of PCI transport layer modes to particular PCI PIs, among other examples. In some examples, mapping can be done in a less static way, for instance, by providing an API for a device driver to request PCI Transport service at run time for a specific task, among other examples.

An implementation of a PCI transport layer can define a plurality of operational modes. In some implementations, one or more registers, or other data structures can be provided that define which PCI transport layer modes have been adopted and are supported by which components of a system. Indeed, the set of modes adopted by a component can be a static configuration attribute and can be defined in a data structure (e.g., 520) persistently maintained in system memory for direct and instant access to the system OS, software applications, or other system elements. Indeed, in some implementations, the PCI transport layers supported by a device can be defined in IP block metadata corresponding to the device. Registers and/or metadata can further define applications or other conditions in which various PCI transport layer modes are to be used by a particular device (e.g., IP block of an SoC). To illustrate, in one example, a system implementing a PCI transport layer and supporting multiple different programming interfaces and bindings into different stacks could support, for instance, a multifunction radio module which might, for example, have a WiFi PCIe Function which uses a proprietary driver (as is the norm today), a WWAN function which binds using a particular mode of an example PCI transport layer (e.g., using a programming interface of example Mode 4 of the example of FIG. 8) to the MBIM stack, and a Bluetooth function which binds to an audio stack using a different programming interface to another one of the PCI transport layer mode (e.g., Mode 2 or 3 of the previous example), among potentially other examples of potentially limitless variability.

In another example, sensor attach use models can further take advantage of a system that enables binding of a PCI transport layer to existing software stacks, for instance, of USB and HID. The ability to interoperate with existing HID software stacks can simplify feature construction using platform sensors for user interaction, for example, a variety of touch and/or imaging sensors could be made to appear to applications as a known pointing device such as a mouse or track pad. While previous solutions have made it difficult to justify host (e.g., Root Complex) optimizations for PCI/PCIe because devices tend to use different transfer mechanisms with different optimization points, an additional benefit of establishing a PCI transport layer and service is that the defined layer can enable the definition of a set of microbenchmarks at the load/store level, based on the broad use of a common set of underlying transport mechanisms, among other example benefits and uses.

Among the uses of a PCI transport layer, enhanced and standardized peer-to-peer (or "device-to-device") transfers can be enabled in some implementations. For example, traditional solutions have relied heavily on sideband datapaths to enable device-to-device transfers, however, this can result in limited silicon and board flexibility and excess cost. In some systems, an architecture can be provided (in some cases built at least partially upon a PCI transport layer) for detecting and configuring direct peer-to-peer connections. Such connections could range from simple connections, such as directing an audio stream from a digital signal processor (DSP) bock to an output device, to core-to-core communication in a multiprocessor system connected using a fabric on which a PCI transport layer is supported (including but not limited to PCIe fabrics formed using switches, nontransparent bridges, etc.). In some implementations, power levels can be realized that are comparable to, and in some cases better than, what can be achieved through direct special purpose peer-to-peer datapaths, all while reducing cost and increasing device/platform flexibility, among other potential advantages.

In one example, direct peer-to-peer transfer (or, simply, "peer transfer" or "direct transfer") functionality can be provided through a PCI transport layer, distinguished from other uses of the PCI transport layer, for instance, as mapped to one or more unique subclasses. A variety of different peer transfer paths can be established between various devices in a system. These various categories of peer transfer can be further sub-layered. For instance, in one example a general type of connection to support audio/video (AV) transport could be discovered based on a PCI subclass identified for one or both of the devices that are to participate in the peer transfer. For instance, a source device in the transfer can be queried to determine additional attributes of the transfer, such as the precise type of data to be transported. In some implementations, attributes of the transaction or application to which the peer transfer is to be applied can be identified and the corresponding configuration of peer transfer can be established by software (e.g., the OS) based on configuration attributes of the involved devices (e.g., as ascertained from IP block metadata included in a data structure (e.g., 520) accessed by the OS). The peer transfer can be configured according to compatibilities determined for the involved source and sink devices as well as the type of transfer (e.g., the type of data, the type of application for which the peer transfer is performed, etc.).

Figure 9:
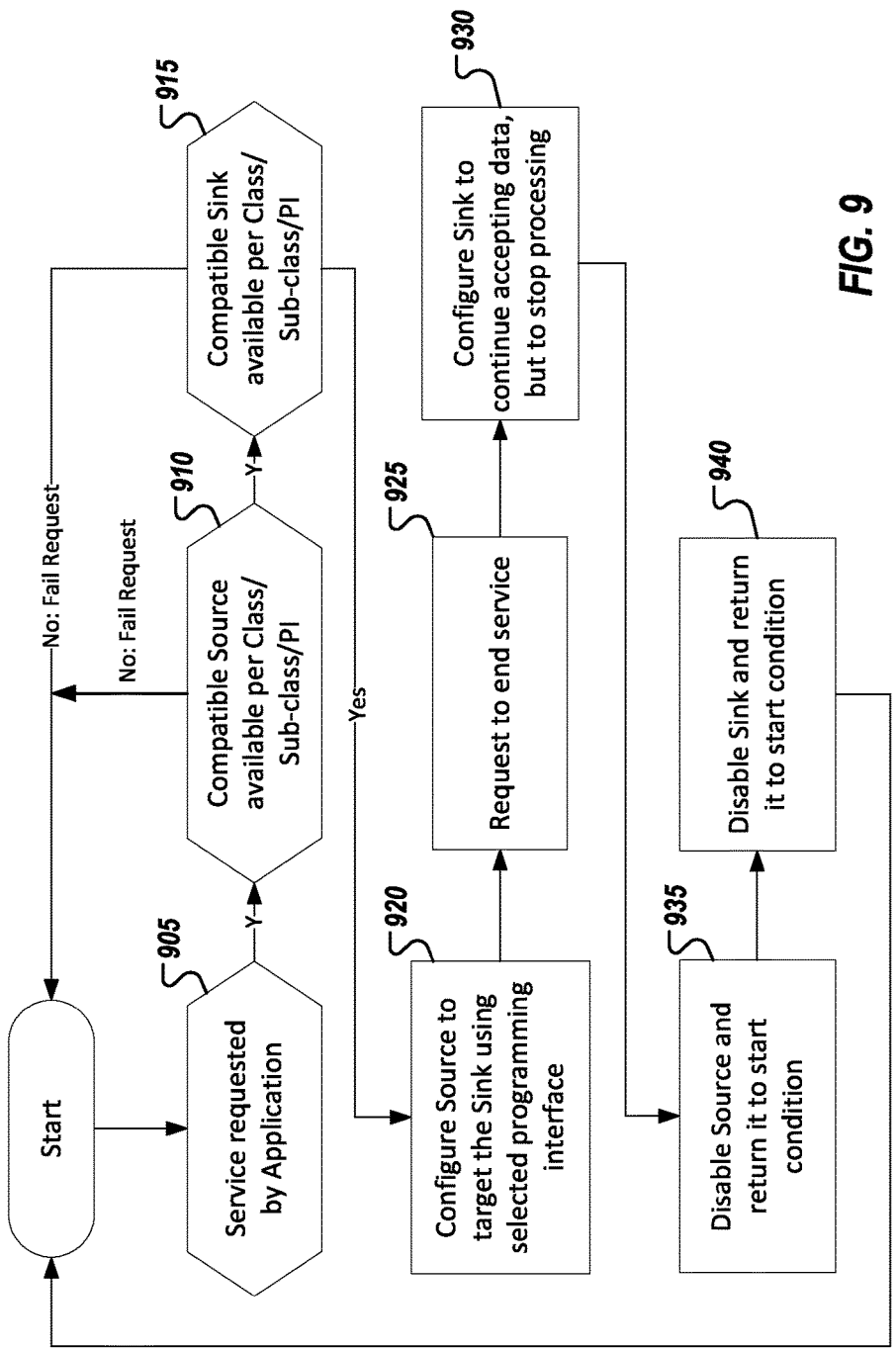
FIG. 9 is a flow diagram showing techniques in a device-to-device data transport.

FIG. 9, illustrates an example flowchart 900 showing an example flow for configuring a peer transfer between a first source device and a second sink device (i.e., that is to receive the transferred data from the source device). In one example, a software application or other program can request 905 a particular service that involves the transfer of data from one source device to another sink device. The source and sink device can be identified based on the request. For instance, a set of one or more candidate source elements can be identified (e.g., by the OS or hub from a data structure of configuration metadata), based on identified capabilities of the respective devices. In other instances, the source and sink device can be explicitly identified. Additionally, in some instances, a type of transport (such as a particular mode that is provided through a PCI transport layer) can also be identified that is appropriate for the type of data to be transferred. Compatibility of the source and sink devices within a type of peer transfer (e.g., provided over services of a PCI transport layer) can be determined. For instance, compatibility can be determined on the basis of an identification 910 of the Class/Subclass/PI of the source device, among other example classifications. If the Class/Subclass/PI of the identified source device is incompatible with the request then the request can be failed. It can also be determined 915 whether the Class/Subclass/PI of the sink device is compatible with the request. If the source and sink devices are compatible, the source device can be configured to target the sink device using a selected programming interface (e.g., of a PCI transport layer). The transfer can proceed until a request to end the peer transfer is received (e.g., at 925). The sink device can be configured to continue accepting data but to stop processing the data (930), for instance, to assist with race conditions that can emerge between the sink and the source upon ending a transfer. To wrap up the peer transfer, the source device, at 935, can then be disabled and returned to a start condition (e.g., in preparation for a potential future transaction). Similarly, the sink device, at 940, can also be disabled and returned to the start condition.

As implied in the previous example, configuration attributes (e.g., supported transport modes, capabilities, etc.) of a device can be identified from a classifier defined by a concatenation of the PCI/PCIe Class/Subclass/PI of the sink device. Each Class/Subclass/PI can be associated with a category of devices capable of providing or participating in corresponding types of services and can be further used to identify compatibilities between devices. Configuration attributes of devices (e.g., on a Class/Subclass/PI basis) can be exposed to software including specific applications running on the system. In some cases, if an application identifies that the system lacks devices for performing a particular transaction, such as a peer transfer, the application can programmatically resort to making up for the identified shortcomings of the hardware, by performing additional steps in software, among other examples.

In some implementations, some datapaths can be dynamically provisioned, at run time, to allow peer communication by determining the system resources for a specific activity corresponding to the peer transport. Other resources that are determined not to be used in a particular peer transport transaction can be powered down, among other examples. Such dynamic use of direct transport can enable SoC activity to be limited to only those blocks that are to be active for a particular workload, ensuring that other resources including SoC fabric elements, buffers, etc. are power gated, during the direct transport activity. In some implementations, the IP blocks in a system (such as an SoC) can include dedicated data movers and heterogeneous I/O-optimized cores that enable I/O-centric workloads to be offloaded from central resources such as larger cores and system memory, to introduce additional efficiencies.

In some implementations, switchover mechanisms can be provided for uses of peer transfer, such as in connection with AV transport, to assist transitioning of data flows, for instance, from different sources, without disruption (e.g. glitching, distortion, etc.) when applications or platform operating modes change. For instance, switchover mechanisms can be used to switch from a mode where the host CPU is performing audio processing, but offloads this task to a specialized engine and shuts down to save power. Further, in some cases, traffic class (TC)/virtual channel (VC) differentiation (such as defined in PCI/PCIe) can also be provided to isolate peer transfer traffic from stalls, such as on TCO/VCO. Alternately, ordering attributes such as Relaxed Ordering (RO) and ID Ordering (IDO), among other PCI/PCIe features can be applied to peer transfer traffic, for instance, to opportunistically allow unblocking of peer transfer traffic, among other examples.

Traditional PCIe is often considered within the context of a high-speed serial physical interface defined for interfacing two components, which may be connected on a single PC board, through wire connectors, cables, etc. PCI/PCIe architecture has also been implemented for on-die integration, however, traditional solutions integrating PCI/PCIe on-die resort to proprietary interfaces, such as the Intel On-chip System Fabric (IOSF). While the cost of developing such proprietary fabrics and SoC integration technologies and methodologies can be justified in some cases, a defined architecture for implementing PCI/PCIe principles for SoC technologies that interoperate with other proprietary technology at minimal development or recurring cost can yield significant benefits. For instance, a variety of new systems and system flexibility can be realized through the use of both internally- and externally-sourced IP blocks. For instance, to facilitate IP block integration, a well-defined interface between the IP block and the remainder of the SoC can be defined. Further, tools and technologies for interfacing IP blocks to each other and to other parts of the SoC can also be generally established, together with an architecture that establishes the operational environment for the IP blocks, including the programming model and other software related aspects.

Figure 10:
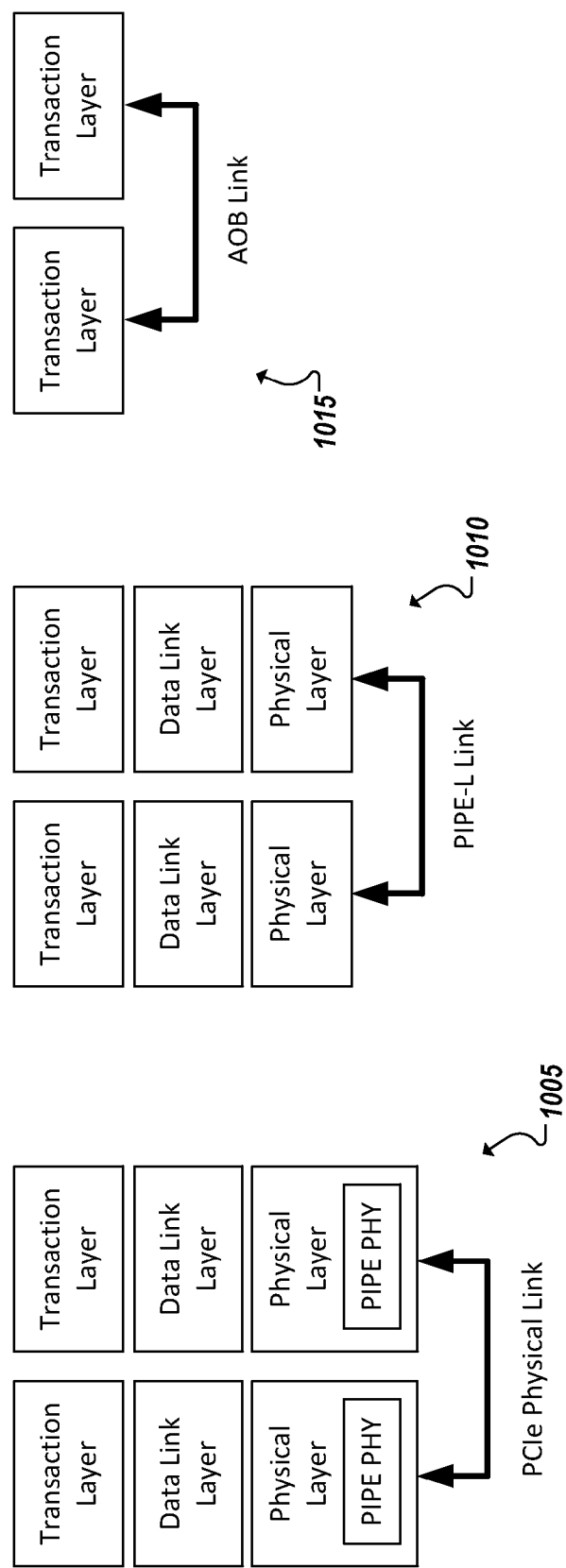
FIG. 10 illustrates simplified block diagrams of example interconnect architectures.

FIG. 10 illustrates a simplified block diagram illustrating various PCI/PCIe architecture models. Inter-device transport in traditional PCI/PCIe systems have often been conceptualized according to a model 1005 where two discrete components (such as a host and device) are connected over a traditional PCIe link implemented using transaction, data link, and physical layers. Further, a PIPE physical layer interface can, in some cases, be utilized. A PIPE interface has been traditionally implemented as a MAC/PHY interface, but can also be used within integrated systems, such as an IP block interface, such as described in U.S. Pat. No. 8,395,416, incorporated herein by reference. As shown in model 1010, an IP block interface implemented using a PIPE interface, or "PIPE-L Link," can be successfully deployed with little or no modifications to the IP block components connected using such links. However, PIPE-L based solutions, in some cases, can suffer from some deficiencies, such as a less than optimized use of silicon area. In still a third category of link, an Area Optimized Block interface (AOB) link can be defined and provided that strips away reliance on data link and physical layer logic and optimizes use of silicon for implementation of the interconnect architecture.

An AOB link can facilitate a direct transaction layer-to-transaction layer interface between IP blocks, such as illustrated in model 1015. In such implementations, the upstream layers of the IP blocks themselves can implement the "fabric" that connects the IP blocks to each other and to the system central resources such as cores and main memory, among other examples.

In one example, an AOB link interface can be provided that includes a library of signals that provides the flexibility of transaction layer-to-transaction layer signaling while maintaining core functionality of the traditional discrete component signaling model (e.g., 1005) established in well-worn traditional PCI/PCIe architectures. In the following example, for generality, the link interface is described with all capabilities present. However, a given instance may not require all capabilities, and a simple subset can be implemented in such cases.

In one example, the AOB link interface can include all types of TLPs that can be generated or consumed, consistent with essential aspects of PCI/PCIe architectures. For instance, PCIe distinguishes three classes of transaction layer packets (TLPs), namely: Posted, NonPosted and Completions, and defines ordering rules based on these three types. The "transmitter" side of the AOB link interface determines the correct order for transmission of TLPs based on flow control information from the "receiver". In some implementations of an AOB link interface, rather than using credit-based flow control, such as in traditional PCI/PCIe, a handshake mechanism can be provided. To provide for such handshakes and other features of an AOB link interface, a library of defined signals can be provided. For instance, in one example of an AOB link interface, the signals and semantics can include:

| SIGNAL | UP/DN-STREAM | DESCRIPTION |
| --- | --- | --- |
| Clock | Dn | Clock driven from transmitter to receiver |
| Reset | Dn | Equivalent to PERST# |
| OBFF | Dn | Carries OBFF semantics (e.g., only, as distinguished from the PCIe practice of multiplexing WAKE# and OBFF) |
| PWRGATE | Dn | Power gate control of downstream block |
| Header[ ] | Dn/Up | PCIe TLP header-width parameterized to 1 Byte, 2 Byte, 4 Byte, n*4 Byte |
| HeaderPosted[ ] | Dn/Up | Posted class TLP header |
| HeaderNonposted[ ] | Dn/Up | Nonposted class TLP header |
| HeaderCompletion[ ] | Dn/Up | Completion class TLP header |
| Payload[ ] | Dn/Up | PCIe TLP Payload-width parameterized to 1 Byte, 2 Byte, 4 Byte, n*4 Byte |
| PayloadPosted[ ] | Dn/Up | Posted class TLP payload |
| PayloadNonposted [ ] | Dn/Up | Nonposted class TLP payload |
| PayloadCompletion[ ] | Dn/Up | Completion class TLP payload |
| Header_Valid | Dn/Up | Indicates Header[ ] contains valid information which must be consumed on the next clock edge |
| HeaderPosted_Valid | Dn/Up | Valid signal for Posted class TLP headers |
| HeaderNonposted_Valid | Dn/Up | Valid signal for Nonposted class TLP headers |
| HeaderCompletion_Valid | Dn/Up | Valid signal for Completion class TLP headers |
| Payload_Valid | Dn/Up | Indicates Payload[ ] contains valid information which must be consumed on the next clock edge-the payload data must be presented in order w/r/t corresponding headers, and must not be presented ahead of the Header |
| PayloadPosted_Valid | Dn/Up | Valid signal for payloads of Posted transaction |
| PayloadNonposted_Valid | Dn/Up | Valid signal for payloads of Nonposted transaction |
| PayloadCompletion_Valid | Dn/Up | Valid signal for payloads of Completion transaction |
| Hold_Posted | Up/Dn | Indicates temporary inability to accept Posted TLPs-transmitter must complete any TLP in progress and then not initiate a new TLP (of any type-due to ordering rule requirements) transfer until this signal is de-asserted. |
| Hold_HeaderPosted | Up/Dn | Indicates inability to accept Posted TLP headers |
| Hold_PayloadPosted | Up/Dn | Indicates inability to accept Posted payload TLPs |
| Hold_Nonposted | Up/Dn | Indicates temporary inability to accept Non-posted TLPs-transmitter must complete any TLP in progress and then not initiate a new Non-posted TLP transfer until this signal is de-asserted. |
| Hold_HeaderNonposted | Up/Dn | Indicates inability to accept Non-posted TLP headers |
| Hold_PayloadNonposted | Up/Dn | Indicates inability to accept Non-posted payload TLPs |
| Hold_Completion | Up/Dn | Indicates temporary inability to accept Completion TLPs-transmitter must complete any TLP in progress and then not initiate a new Completion TLP transfer until this signal is de-asserted. |
| Hold_HeaderCompletion | Up/Dn | Indicates inability to accept TLP completion header |
| Hold_PayloadCompletion | Up/Dn | Indicates inability to accept TLP completion payload |
| Rx_Error | Up/Dn | Indicates an error that prevents the receiver from continuing to process TLPs |

In some implementations, headers can be adopt formatting of headers in PCI/PCIe. However, in some instances, headers can be defined to be smaller in size than traditional PCI/PCIe headers to account, for instance, for narrowing link widths implemented in an integrated system, among other examples. As notated by Up/Dn and Dn/Up notation in the preceding table, some signals can be asserted upstream by a potential sink device to potential source devices (i.e., Up/Dn) to thereby affect the source device (e.g., a hold signal). Alternatively, other signals can be asserted by the sender of data to include information concerning the data sent (or to be sent) (i.e., Dn/Up), such as a valid signal.

Turning to FIGS. 11A-11D are flowcharts 1100a-1100d illustrating example techniques that can be employed in SoC architectures and other systems. For instance, in the example of FIG. 11A, configuration metadata can be persistently stored in a data structure that is accessible to an operating system or other system software and describes various (in some cases, static) configuration parameters of the devices on a system. In some cases, the devices can be integrated into the system, for instance, as IP blocks, chips, or other components of an SoC. The preexisting (e.g., prior to runtime) data structure can be identified 1105, for instance, at runtime, with the configuration parameters of one or more of the system devices already defined in the data structure. Specific configuration parameters of each device can be identified 1110 by accessing and reading from the data structure (e.g., using an operating system). The devices can be configured based at least in part on these configuration parameters identified 1110 from the data structure. Other configuration parameters of one or more of the devices can be identified and defined at runtime, for instance, by a scan of system firmware (e.g., BIOS) and can be used in connection with the configuration parameters identified from the data structure to configure the respective devices, among other examples.

In FIG. 11B, a data structure based on or including device configuration metadata can be accessed 1120, for instance, by an operating system or other system software. The configuration metadata can be persistently stored in a data structure and describe various (in some cases, static) configuration parameters of the devices on a system, as well as the system (e.g., an SoC) as a whole. The configuration parameters can also be used to identify 1125 that the logic (e.g., a driver or other hardware and/or software logic) of the device is bound to and uses a standardized transport layer. The transport layer can be a PCIe transport layer provided as a service for use by other devices, including devices that utilize other protocols as their native protocol. In some instances, the transport layer can define multiple modes and a subset of the transport layer modes supported or used by the device can be determined 1130 from the configuration parameters. In one example, configuration parameters can be predefined (e.g., prior to runtime) and indicate a Class, Sub-class, an/or programming interface of the devices in the system, and bindings and use of the transport layer by the device, as well as the transport layer modes used by the devices, can be identified from the respective Class, Sub-class, an/or programming interface classification of the device.

Turning to FIG. 11C, in some examples, a service request can be identified 1140, such as a service request of a software application on a system. The service request can be identified as associated with a direct device-to-device, or peer-to-peer, data transfer. First and second devices can be identified that include capabilities for performing at least a portion of the requested service through a device-to-device data transfer. Compatibility of the first device with the second device in a device-to-device data transfer can be determined 145. Identifying the capabilities of the devices and determining their compatibility can be based on device configuration information stored in a configuration data structure and/or device registers, among other examples. If the first and second devices are compatible, the first device (and potentially also the second device) can be configured 1150 to perform the device-to-device data transfer. Other devices not involved in the data transfer may be temporarily idled or deactivated while the first and second devices complete the device-to-device data transfer (or "peer transfer"), among other examples.

In FIG. 11D, a flowchart 1100*d* shows an example including the identifying 1160 of data describing a set of devices to be included in a system on chip (SoC) or other integrated system. The data can include device metadata, build collateral information, test results, user documentation, among other examples. The data can be acquired 1165 for each device in the set of devices. For example, respective data sources can be identified for each device in the set and the data sources can be queried for the data. Data returned from the queries of identified sources can be processed, for instance, by a stitcher or other system design tool, to determine 1170 configuration of an integrated system that includes the set of devices. System configuration data describing the determined configuration can be generated and can be used to generate a configuration data structure for use within the system, used in an automated design of an operating system configuration for the system, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 12:
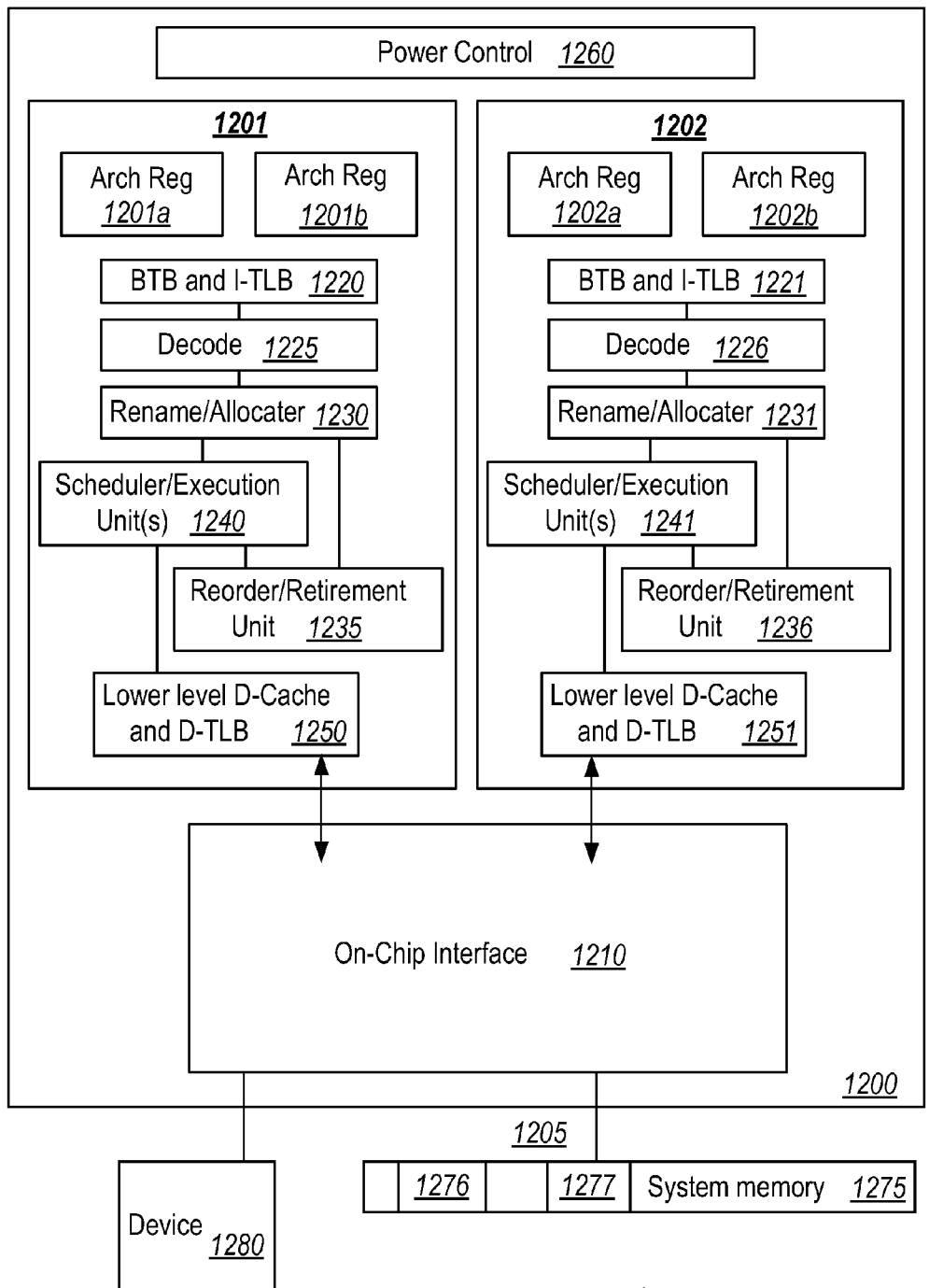
FIG. 12 illustrates an embodiment of a block diagram for a computing system including a multicore processor.

Referring to FIG. 12, an embodiment of a block diagram for a computing system including a multicore processor is depicted. Processor 1200 includes any processor or processing device, such as a microprocessor, an embedded processor, a digital signal processor (DSP), a network processor, a handheld processor, an application processor, a co-processor, a system on a chip (SOC), or other device to execute code. Processor 1200, in one embodiment, includes at least two cores—core 1201 and 1202, which may include asymmetric cores or symmetric cores (the illustrated embodiment). However, processor 1200 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1200, as illustrated in FIG. 12, includes two cores—core 1201 and 1202. Here, core 1201 and 1202 are considered symmetric cores, i.e. cores with the same configurations, functional units, and/or logic. In another embodiment, core 1201 includes an out-of-order processor core, while core 1202 includes an in-order processor core. However, cores 1201 and 1202 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1201 are described in further detail below, as the units in core 1202 operate in a similar manner in the depicted embodiment.

As depicted, core 1201 includes two hardware threads 1201*a* and 1201*b*, which may also be referred to as hardware thread slots 1201*a* and 1201*b*. Therefore, software entities, such as an operating system, in one embodiment potentially view processor 1200 as four separate processors, i.e., four logical processors or processing elements capable of executing four software threads concurrently. As alluded to above, a first thread is associated with architecture state registers 1201*a*, a second thread is associated with architecture state registers 1201*b*, a third thread may be associated with architecture state registers 1202*a*, and a fourth thread may be associated with architecture state registers 1202*b*. Here, each of the architecture state registers (1201*a*, 1201*b*, 1202*a*, and 1202*b*) may be referred to as processing elements, thread slots, or thread units, as described above. As illustrated, architecture state registers 1201*a* are replicated in architecture state registers 1201*b*, so individual architecture states/contexts are capable of being stored for logical processor 1201*a* and logical processor 1201*b*. In core 1201, other smaller resources, such as instruction pointers and renaming logic in allocator and renamer block 1230 may also be replicated for threads 1201*a* and 1201*b*. Some resources, such as re-order buffers in reorder/retirement unit 1235, ILTB 1220, load/store buffers, and queues may be shared through partitioning. Other resources, such as general purpose internal registers, page-table base register(s), low-level data-cache and data-TLB 1215, execution unit(s) 1240, and portions of out-of-order unit 1235 are potentially fully shared.

Processor 1200 often includes other resources, which may be fully shared, shared through partitioning, or dedicated by/to processing elements. In FIG. 12, an embodiment of a purely exemplary processor with illustrative logical units/resources of a processor is illustrated. Note that a processor may include, or omit, any of these functional units, as well as include any other known functional units, logic, or firmware not depicted. As illustrated, core 1201 includes a simplified, representative out-of-order (OOO) processor core. But an in-order processor may be utilized in different embodiments. The OOO core includes a branch target buffer 1220 to predict branches to be executed/taken and an instruction-translation buffer (I-TLB) 1220 to store address translation entries for instructions.

Core 1201 further includes decode module 1225 coupled to fetch unit 1220 to decode fetched elements. Fetch logic, in one embodiment, includes individual sequencers associated with thread slots 1201*a*, 1201*b*, respectively. Usually core 1201 is associated with a first ISA, which defines/specifies instructions executable on processor 1200. Often machine code instructions that are part of the first ISA include a portion of the instruction (referred to as an opcode), which references/specifies an instruction or operation to be performed. Decode logic 1225 includes circuitry that recognizes these instructions from their opcodes and passes the decoded instructions on in the pipeline for processing as defined by the first ISA. For example, as discussed in more detail below decoders 1225, in one embodiment, include logic designed or adapted to recognize specific instructions, such as transactional instruction. As a result of the recognition by decoders 1225, the architecture or core 1201 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1226, in one embodiment, recognize the same ISA (or a subset thereof). Alternatively, in a heterogeneous core environment, decoders 1226 recognize a second ISA (either a subset of the first ISA or a distinct ISA).

In one example, allocator and renamer block 1230 includes an allocator to reserve resources, such as register files to store instruction processing results. However, threads 1201*a* and 1201*b* are potentially capable of out-of-order execution, where allocator and renamer block 1230 also reserves other resources, such as reorder buffers to track instruction results. Unit 1230 may also include a register renamer to rename program/instruction reference registers to other registers internal to processor 1200. Reorder/retirement unit 1235 includes components, such as the reorder buffers mentioned above, load buffers, and store buffers, to support out-of-order execution and later in-order retirement of instructions executed out-of-order.

Scheduler and execution unit(s) block 1240, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1250 are coupled to execution unit(s) 1240. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1201 and 1202 share access to higher-level or further-out cache, such as a second level cache associated with on-chip interface 1210. Note that higher-level or further-out refers to cache levels increasing or getting further way from the execution unit(s). In one embodiment, higher-level cache is a last-level data cache—last cache in the memory hierarchy on processor 1200—such as a second or third level data cache. However, higher level cache is not so limited, as it may be associated with or include an instruction cache. A trace cache—a type of instruction cache—instead may be coupled after decoder 1225 to store recently decoded traces. Here, an instruction potentially refers to a macro-instruction (i.e. a general instruction recognized by the decoders), which may decode into a number of micro-instructions (micro-operations).

In the depicted configuration, processor 1200 also includes on-chip interface module 1210. Historically, a memory controller, which is described in more detail below, has been included in a computing system external to processor 1200. In this scenario, on-chip interface 121 is to communicate with devices external to processor 1200, such as system memory 1275, a chipset (often including a memory controller hub to connect to memory 1275 and an I/O controller hub to connect peripheral devices), a memory controller hub, a northbridge, or other integrated circuit. And in this scenario, bus 1205 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1275 may be dedicated to processor 1200 or shared with other devices in a system. Common examples of types of memory 1275 include DRAM, SRAM, non-volatile memory (NV memory), and other known storage devices. Note that device 1280 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1200. For example in one embodiment, a memory controller hub is on the same package and/or die with processor 1200. Here, a portion of the core (an on-core portion) 1210 includes one or more controller(s) for interfacing with other devices such as memory 1275 or a graphics device 1280. The configuration including an interconnect and controllers for interfacing with such devices is often referred to as an on-core (or un-core configuration). As an example, on-chip interface 1210 includes a ring interconnect for on-chip communication and a high-speed serial point-to-point link 1205 for off-chip communication. Yet, in the SOC environment, even more devices, such as the network interface, co-processors, memory 1275, graphics processor 1280, and any other known computer devices/interface may be integrated on a single die or integrated circuit to provide small form factor with high functionality and low power consumption.

In one embodiment, processor 1200 is capable of executing a compiler, optimization, and/or translator code 1277 to compile, translate, and/or optimize application code 1276 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 13:
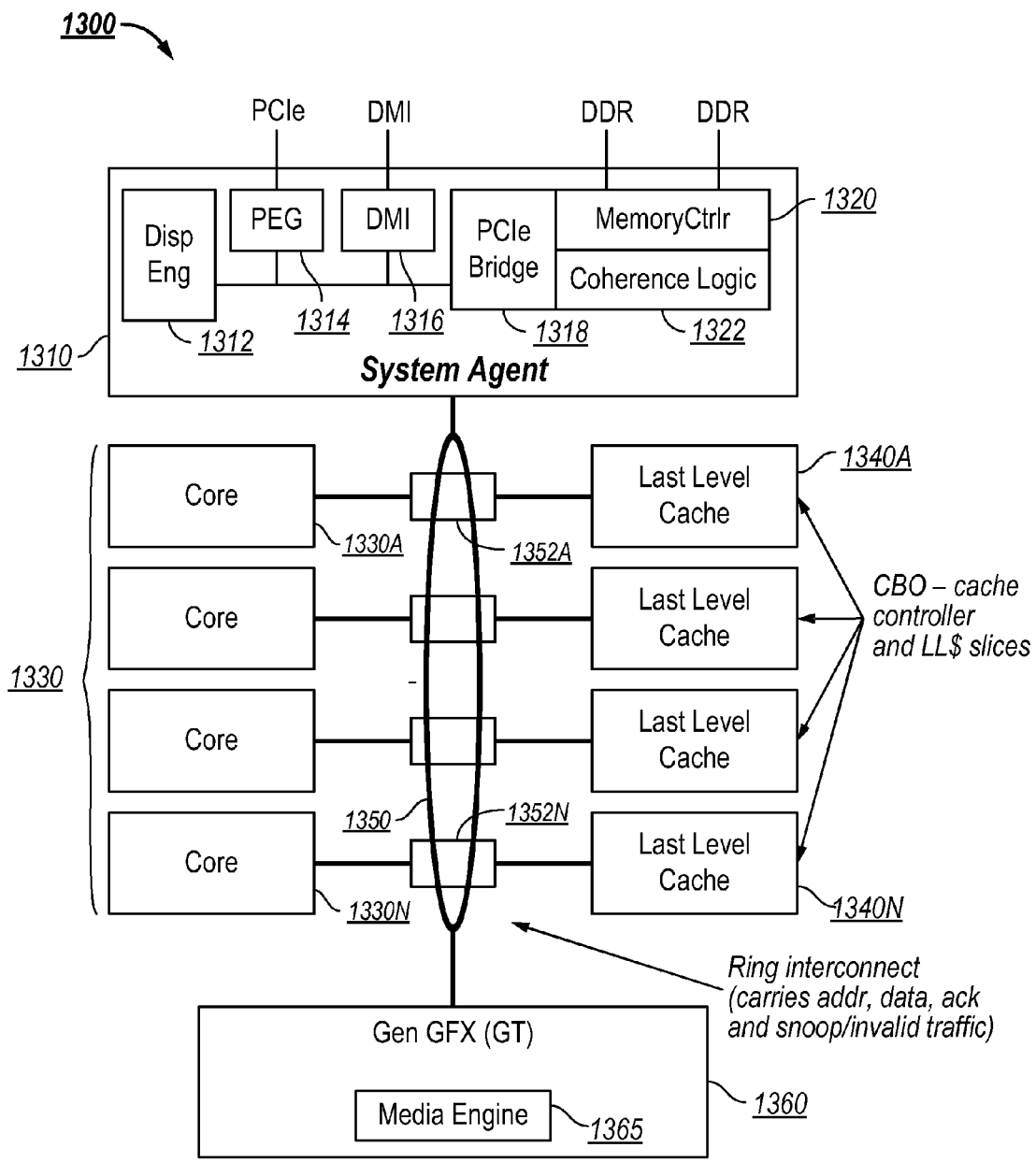
FIG. 13 illustrates another embodiment of a block diagram for a computing system including a multicore processor.

Referring now to FIG. 13, shown is a block diagram of an embodiment of a multicore processor. As shown in the embodiment of FIG. 13, processor 1300 includes multiple domains. Specifically, a core domain 1330 includes a plurality of cores 1330A-1330N, a graphics domain 1360 includes one or more graphics engines having a media engine 1365, and a system agent domain 1310.

In various embodiments, system agent domain 1310 handles power control events and power management, such that individual units of domains 1330 and 1360 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1330 and 1360 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1330 further includes low level caches in addition to various execution units and additional processing elements. Here, the various cores are coupled to each other and to a shared cache memory that is formed of a plurality of units or slices of a last level cache (LLC) 1340A-1340N; these LLCs often include storage and cache controller functionality and are shared amongst the cores, as well as potentially among the graphics engine too.

As seen, a ring interconnect 1350 couples the cores together, and provides interconnection between the core domain 1330, graphics domain 1360 and system agent circuitry 1310, via a plurality of ring stops 1352A-1352N, each at a coupling between a core and LLC slice. As seen in FIG. 13, interconnect 1350 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1310 includes display engine 1312 which is to provide control of and an interface to an associated display. System agent domain 1310 may include other units, such as: an integrated memory controller 1320 that provides for an interface to a system memory (e.g., a DRAM implemented with multiple DIMMs; coherence logic 1322 to perform memory coherence operations. Multiple interfaces may be present to enable interconnection between the processor and other circuitry. For example, in one embodiment at least one direct media interface (DMI) 1316 interface is provided as well as one or more PCIe™ interfaces 1314. The display engine and these interfaces typically couple to memory via a PCIe™ bridge 1318. Still further, to provide for communications between other agents, such as additional processors or other circuitry, one or more other interfaces may be provided.

Figure 14:
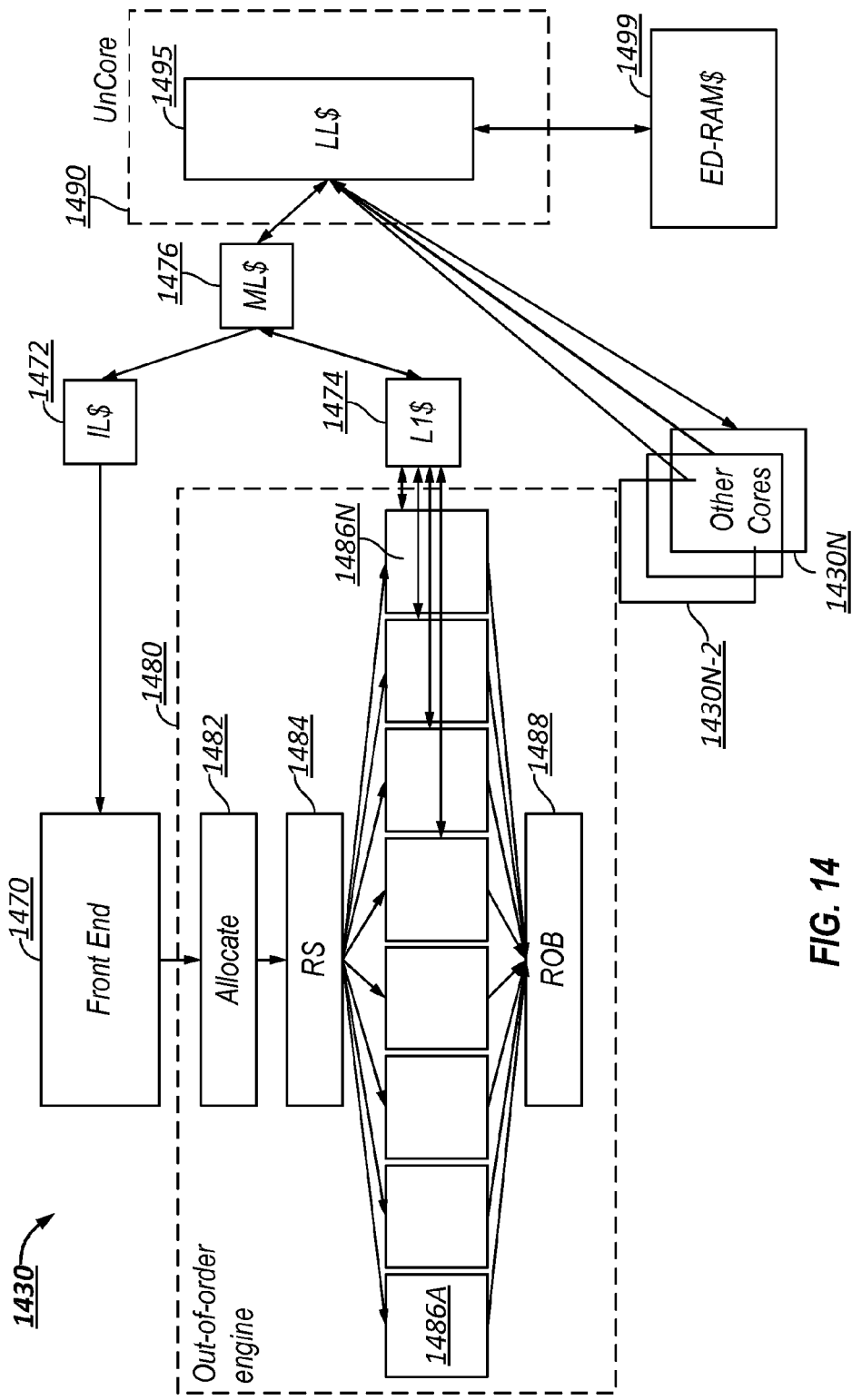
FIG. 14 illustrates an embodiment of a block diagram for a processor.

Referring now to FIG. 14, shown is a block diagram of a representative core; specifically, logical blocks of a back-end of a core, such as core 1330 from FIG. 13. In general, the structure shown in FIG. 14 includes an out-of-order processor that has a front end unit 1470 used to fetch incoming instructions, perform various processing (e.g. caching, decoding, branch predicting, etc.) and passing instructions/operations along to an out-of-order (OOO) engine 1480. OOO engine 1480 performs further processing on decoded instructions.

Specifically in the embodiment of FIG. 14, out-of-order engine 1480 includes an allocate unit 1482 to receive decoded instructions, which may be in the form of one or more micro-instructions or uops, from front end unit 1470, and allocate them to appropriate resources such as registers and so forth. Next, the instructions are provided to a reservation station 1484, which reserves resources and schedules them for execution on one of a plurality of execution units 1486A-1486N. Various types of execution units may be present, including, for example, arithmetic logic units (ALUs), load and store units, vector processing units (VPUs), floating point execution units, among others. Results from these different execution units are provided to a reorder buffer (ROB) 1488, which take unordered results and return them to correct program order.

Still referring to FIG. 14, note that both front end unit 1470 and out-of-order engine 1480 are coupled to different levels of a memory hierarchy. Specifically shown is an instruction level cache 1472, that in turn couples to a mid-level cache 1476, that in turn couples to a last level cache 1495. In one embodiment, last level cache 1495 is implemented in an on-chip (sometimes referred to as uncore) unit 1490. As an example, unit 1490 is similar to system agent 1310 of FIG. 13. As discussed above, uncore 1490 communicates with system memory 1499, which, in the illustrated embodiment, is implemented via ED RAM. Note also that the various execution units 1486 within out-of-order engine 1480 are in communication with a first level cache 1474 that also is in communication with mid-level cache 1476. Note also that additional cores 1430N-2-1430N can couple to LLC 1495. Although shown at this high level in the embodiment of FIG. 14, understand that various alterations and additional components may be present.

Figure 15:
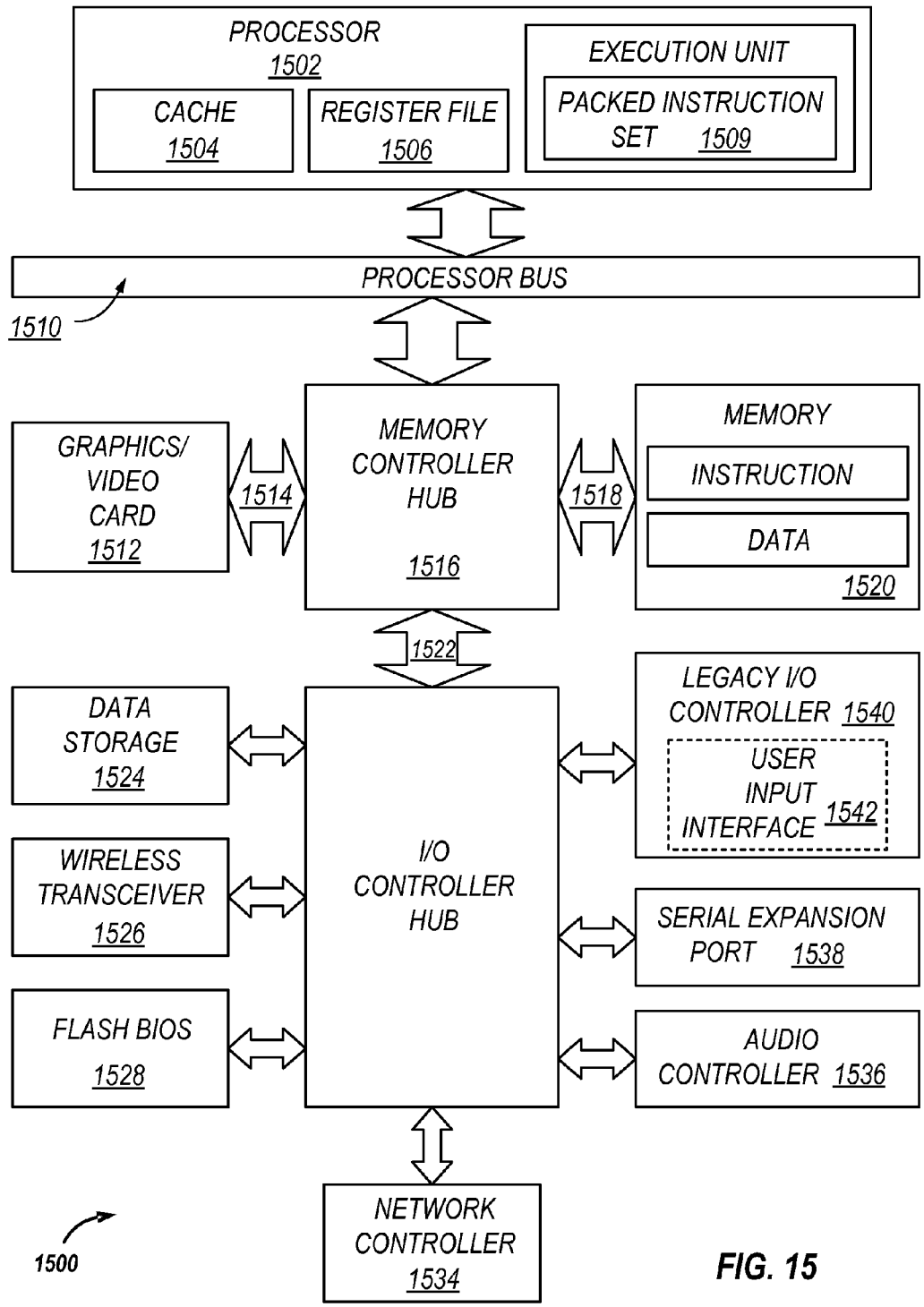
FIG. 15 illustrates another embodiment of a block diagram for a computing system including a processor.

Turning to FIG. 15, a block diagram of an exemplary computer system formed with a processor that includes execution units to execute an instruction, where one or more of the interconnects implement one or more features in accordance with one embodiment of the present invention is illustrated. System 1500 includes a component, such as a processor 1502 to employ execution units including logic to perform algorithms for process data, in accordance with the present invention, such as in the embodiment described herein. System 1500 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1500 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1502 includes one or more execution units 1508 to implement an algorithm that is to perform at least one instruction. One embodiment may be described in the context of a single processor desktop or server system, but alternative embodiments may be included in a multiprocessor system. System 1500 is an example of a 'hub' system architecture. The computer system 1500 includes a processor 1502 to process data signals. The processor 1502, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1502 is coupled to a processor bus 1510 that transmits data signals between the processor 1502 and other components in the system 1500. The elements of system 1500 (e.g. graphics accelerator 1512, memory controller hub 1516, memory 1520, I/O controller hub 1524, wireless transceiver 1526, Flash BIOS 1528, Network controller 1534, Audio controller 1536, Serial expansion port 1538, I/O controller 1540, etc.) perform their conventional functions that are well known to those familiar with the art.

In one embodiment, the processor 1502 includes a Level 1 (L1) internal cache memory 1504. Depending on the architecture, the processor 1502 may have a single internal cache or multiple levels of internal caches. Other embodiments include a combination of both internal and external caches depending on the particular implementation and needs. Register file 1506 is to store different types of data in various registers including integer registers, floating point registers, vector registers, banked registers, shadow registers, checkpoint registers, status registers, and instruction pointer register.

Execution unit 1508, including logic to perform integer and floating point operations, also resides in the processor 1502. The processor 1502, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1502. For one embodiment, execution unit 1508 includes logic to handle a packed instruction set 1509. By including the packed instruction set 1509 in the instruction set of a general-purpose processor 1502, along with associated circuitry to execute the instructions, the operations used by many multimedia applications may be performed using packed data in a general-purpose processor 1502. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1508 may also be used in micro controllers, embedded processors, graphics devices, DSPs, and other types of logic circuits. System 1500 includes a memory 1520. Memory 1520 includes a dynamic random access memory (DRAM) device, a static random access memory (SRAM) device, flash memory device, or other memory device. Memory 1520 stores instructions and/or data represented by data signals that are to be executed by the processor 1502.

Note that any of the aforementioned features or aspects of the invention may be utilized on one or more interconnect illustrated in FIG. 15. For example, an on-die interconnect (ODI), which is not shown, for coupling internal units of processor 1502 implements one or more aspects of the invention described above. Or the invention is associated with a processor bus 1510 (e.g. other known high performance computing interconnect), a high bandwidth memory path 1518 to memory 1520, a point-to-point link to graphics accelerator 1512 (e.g. a Peripheral Component Interconnect express (PCIe) compliant fabric), a controller hub interconnect 1522, an I/O or other interconnect (e.g. USB, PCI, PCIe) for coupling the other illustrated components. Some examples of such components include the audio controller 1536, firmware hub (flash BIOS) 1528, wireless transceiver 1526, data storage 1524, legacy I/O controller 1510 containing user input and keyboard interfaces 1542, a serial expansion port 1538 such as Universal Serial Bus (USB), and a network controller 1534. The data storage device 1524 can comprise a hard disk drive, a floppy disk drive, a CD-ROM device, a flash memory device, or other mass storage device.

Figure 16:
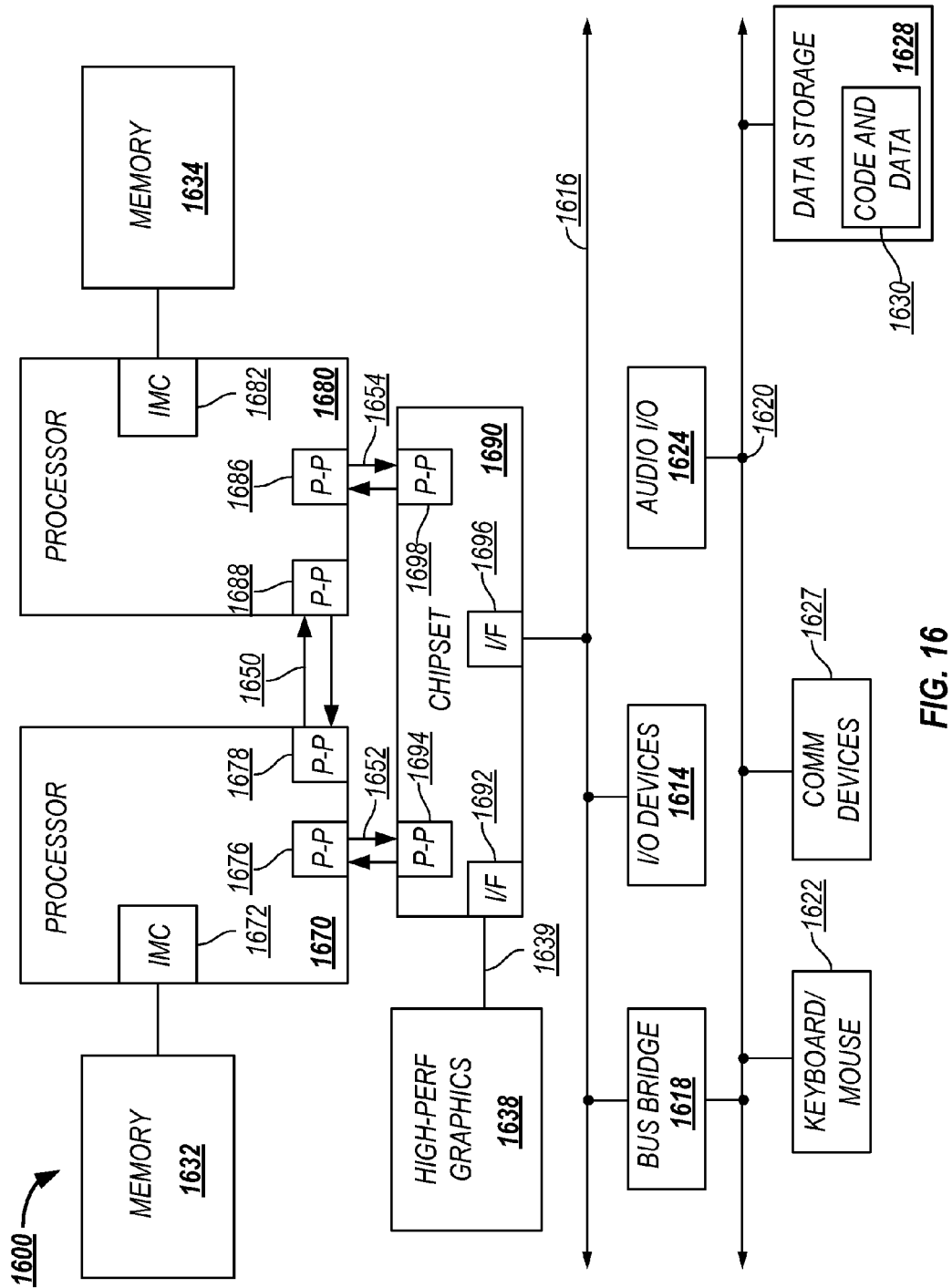
FIG. 16 illustrates an embodiment of a block for a computing system including multiple processors.

Referring now to FIG. 16, shown is a block diagram of a second system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of a processor. In one embodiment, 1652 and 1654 are part of a serial, point-to-point coherent interconnect fabric, such as a high-performance architecture. As a result, the invention may be implemented within the QPI architecture.

While shown with only two processors 1670, 1680, it is to be understood that the scope of the present invention is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 each exchange information with a chipset 1690 via individual P-P interfaces 1652, 1654 using point to point interface circuits 1676, 1694, 1686, 1698. Chipset 1690 also exchanges information with a high-performance graphics circuit 1638 via an interface circuit 1692 along a high-performance graphics interconnect 1639.

A shared cache (not shown) may be included in either processor or outside of both processors; yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 are coupled to first bus 1616, along with a bus bridge 1618 which couples first bus 1616 to a second bus 1620. In one embodiment, second bus 1620 includes a low pin count (LPC) bus. Various devices are coupled to second bus 1620 including, for example, a keyboard and/or mouse 1622, communication devices 1627 and a storage unit 1628 such as a disk drive or other mass storage device which often includes instructions/code and data 1630, in one embodiment. Further, an audio I/O 1624 is shown coupled to second bus 1620. Note that other architectures are possible, where the included components and interconnect architectures vary. For example, instead of the point-to-point architecture of FIG. 16, a system may implement a multi-drop bus or other such architecture.

Figure 17:
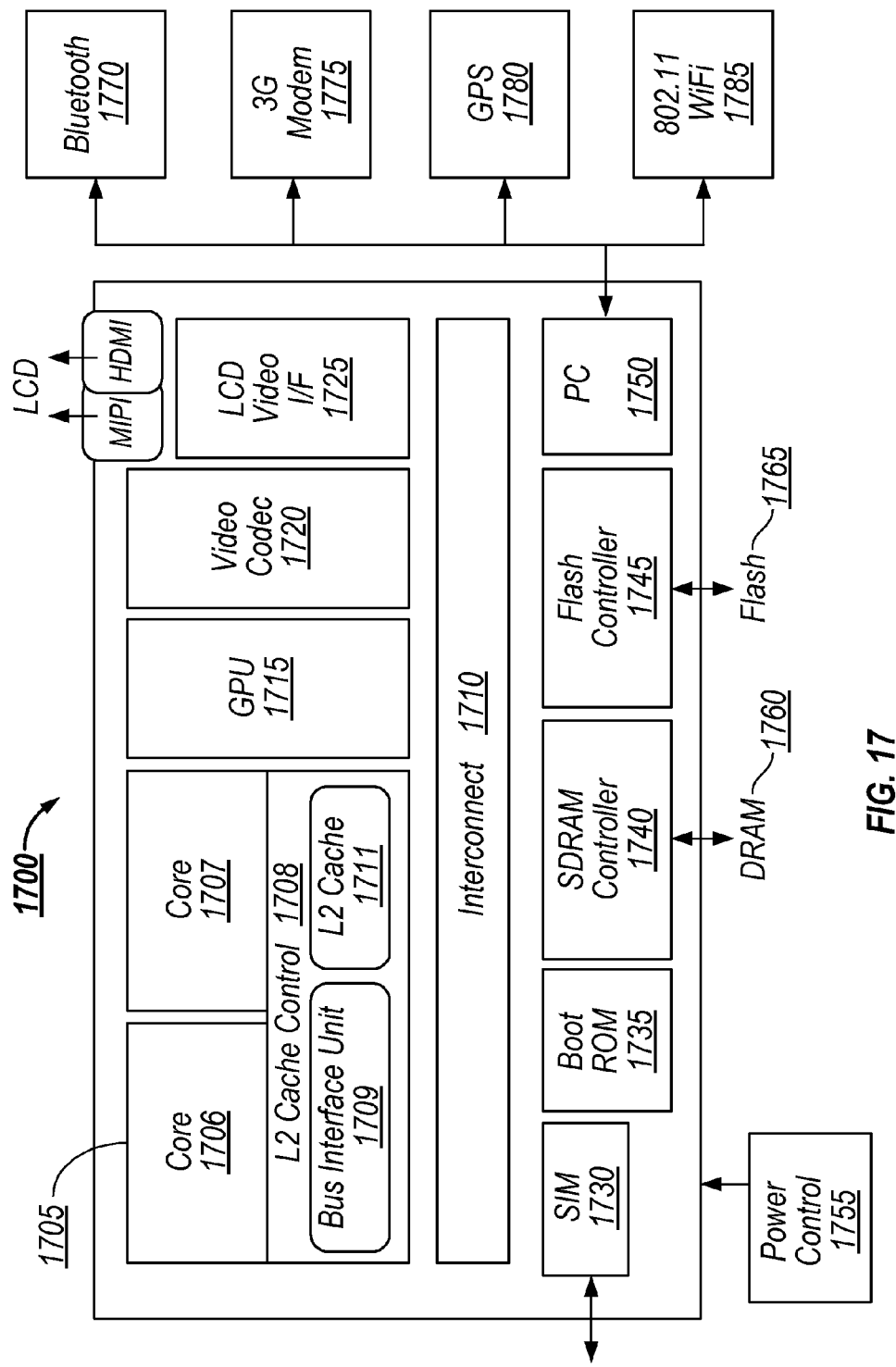
FIG. 17 illustrates an example system implemented as system on chip (SoC).

Turning next to FIG. 17, an embodiment of a system on-chip (SOC) design in accordance with the inventions is depicted. As a specific illustrative example, SOC 1700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1700 includes 2 cores—1706 and 1707. Similar to the discussion above, cores 1706 and 1707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1706 and 1707 are coupled to cache control 1708 that is associated with bus interface unit 1709 and L2 cache 1711 to communicate with other parts of system 1700. Interconnect 1710 includes an on-chip interconnect, such as an IOSF, AMBA, or other interconnect discussed above, which potentially implements one or more aspects of described herein.

Interface 1710 provides communication channels to the other components, such as a Subscriber Identity Module (SIM) 1730 to interface with a SIM card, a boot rom 1735 to hold boot code for execution by cores 1706 and 1707 to initialize and boot SOC 1700, a SDRAM controller 1740 to interface with external memory (e.g. DRAM 1760), a flash controller 1745 to interface with non-volatile memory (e.g.

Flash 1765), a peripheral control 1750 (e.g. Serial Peripheral Interface) to interface with peripherals, video codecs 1720 and Video interface 1725 to display and receive input (e.g. touch enabled input), GPU 1715 to perform graphics related computations, etc. Any of these interfaces may incorporate aspects of the invention described herein.

In addition, the system illustrates peripherals for communication, such as a Bluetooth module 1770, 3G modem 1775, GPS 1785, and WiFi 1785. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to access a data structure that defines configuration parameters of one or more integrated blocks in an integrated circuit device; and configure one or more of the integrated blocks based on corresponding configuration parameters defined in the data structure, where the configuration parameters are set prior to runtime and are to be persistently stored in the data structure.

In at least one example, the configuration parameters are based on metadata maintained for the one or more integrated blocks.

In at least one example, at least some of the configuration parameters are defined at build time of the integrated circuit device.

In at least one example, at least a portion of the configuration parameters defined in the data structure include Peripheral Component Interconnect (PCI) Express (PCIe) capabilities.

In at least one example, the configuration parameters include transport modes supported by the respective device, where the transport modes include modes in a defined transport layer.

In at least one example, the data structure identifies, for each of the one or more integrated blocks, the respective PCI class, subclass, and programming interface of the integrated block.

In at least one example, one or more registers in the integrated circuit device are populated at runtime based on configuration information defined in the data structure.

In at least one example, data can be accessed that is generated at runtime from queries of registers associated with the one or more integrated blocks.

In at least one example, data can be received that identifies additional configuration parameters of at least one of the one or more integrated blocks, where the additional configuration parameters are discovered at runtime.

In at least one example, the configuring is performed by an operating system and the data is received from BIOS.

In at least one example, one or more registers in the system are linked to data structure and populated with configuration parameters defined in the data structure, and a particular one of the configuration parameters defined in the data structure can be changed, where a particular register value is updated to reflect the change to the particular configuration parameter based on a link between the particular register value and the data structure.

In at least one example, an apparatus is provided to include an integrated circuit comprising a processing element and a plurality of integrated blocks, persistent storage to hold a plurality of configuration parameters prior to runtime for at least one of the plurality of integrated blocks, and logic to configure the at least one of the plurality of integrated blocks based on the plurality of configuration parameters and to service accesses to status registers for the at least one of the plurality of integrated blocks from the persistent storage.

In at least one example, a system is provided to include A system comprising at least one data processor, a plurality of devices, a data structure stored in memory and defining configuration parameters of one or more of the plurality of devices, where the configuration parameters are persistently defined, and an operating system to access the data structure and configure one or more of the devices based on corresponding configuration parameters defined in the data structure.

In at least one example, at least a portion of the plurality of devices include IP blocks.

In at least one example, the system includes a system on chip.

In at least one example, an apparatus is provided to include system memory to store a data structure that is to define configuration parameters of one or more devices in a system, and configuration logic to configure one or more of the devices based on corresponding configuration parameters defined in the data structure, where the configuration parameters are set prior to runtime of the system and are persistently stored in the data structure. The data structure can be operating system modifiable.

One or more embodiments may provide an apparatus, a system, a machine readable storage, a machine readable medium, hardware- and/or software-based logic, and a method to provide at least one upper protocol layer and a standardized transport layer, where the transport layer to employ a load/store architecture and to include a plurality of defined transport modes, where the upper protocol layer is to utilize services provided through at least a particular one of the modes.

In at least one example, the transport layer is made available for use by each of different devices within a system.

In at least one example, the upper protocol layer and the standardized transport layer are to be used by a driver of a particular one of a plurality of devices in the system.

In at least one example, the system includes a system on chip.

In at least one example, the plurality of devices are integrated into the system.

In at least one example, each of the plurality of devices is to have an associated driver utilizing the transport layer.

In at least one example, the transport layer includes PCI-based transport services.

In at least one example, the transport layer includes PCIe-based transport services.

In at least one example, the transport layer is based on a first transport protocol and the upper protocol layer is based on a different second protocol.

In at least one example, the plurality of modes includes at least five modes.

In at least one example, a particular one of the plurality of modes includes a mode permitting multiple queuing and scatter/gather.

In at least one example, another one of the plurality of modes includes a simplified mode without scatter/gather.

In at least one example, another one of the plurality of modes includes a simplified mode with fixed buffers in system memory and the simplified mode include bus mastering.

In at least one example, a third one of the plurality of modes includes a simplified mode without bus mastering.

In at least one example, another one of the plurality of modes includes a simplified mode providing byte stream support for data movement without bus mastering.

In at least one example, the upper level protocol is to utilize two or more of the plurality of modes of the transport layer.

In at least one example, the upper level protocol is to utilize less than all of the plurality of modes of the transport layer.

In one or more embodiments, a system can be provided that includes at least one data processor, an interconnect fabric, a first device including first transport logic to access and utilize a standardized transport layer, where the transport layer is to employ a load/store architecture and is to include a plurality of defined transport modes. The system can include a second device that includes second transport logic to access and utilize the standardized transport layer.

In at least one example, at least one memory element can be provided to store at least one data structure to define, for at least the first and second devices, which of the plurality of modes is supported by the respective device.

In at least one example, the system can include configuration logic for configuring the first and second devices based on configuration attributes identified in the data structure.

In at least one example, the first transport logic is defined to utilize a first subset of the plurality of modes and the second transport logic is defined to utilize a different second subset of the plurality of modes.

In at least one example, the first device includes a first IP block and the second device includes a second IP block.

In at least one example, the system includes a system on chip (SoC).

One or more embodiments may provide an apparatus, a system, a machine readable storage, a machine readable medium, hardware- and/or software-based logic, and a method to access a data structure that defines configuration parameters of one or more devices in a system, and identify, from the configuration parameters, that logic of a particular one of the devices is bound to a standardized transport layer, where the transport layer is to employ a load/store architecture and is to include a plurality of defined transport modes, and determine which of the plurality of modes is to apply to the particular device.

In at least one example, one or more of the devices are configured based on corresponding configuration parameters defined in the data structure.

In at least one example, the configuration parameters are set prior to runtime of the system and are persistently stored in the data structure.

In at least one example, conditions are determined in which logic of the particular device is to use a particular one of the plurality of modes.

In at least one example, transport of data from the particular device using a particular one of the plurality of modes is facilitated.

In at least one example, the data is to be transported directly from the particular device to another one of the devices.

In at least one example, one or more of the devices are configured based on corresponding configuration parameters defined in the data structure.

One or more embodiments may provide an apparatus, a system, a machine readable storage, a machine readable medium, hardware- and/or software-based logic, and a method to determine compatibility of a first device with a second device for device-to-device data transfer and configure the first device for the for device-to-device data transfer, where the compatibility is to be based on a classification of the first device based on a Class, a Subclass, and a Programming interface (PI) of the first device and a classification of the second device based on a Class, a Subclass, and a Programming interface (PI) of the second device.

In at least one example, the compatibility is to be determined from a data structure identifying configuration information for each device.

In at least one example, the configuration parameters are persistently set in the data structure prior to runtime of the system and the data structure is persistently stored in system memory.

In at least one example, the configuration logic is further to identify a service request and configure the device-to-device data transfer for the service request.

In at least one example, the service request includes a service request of a software application.

In at least one example, the configuration logic is to identify the first device as a source based on the service request, and identify the second device as a sink based on the service request.

In at least one example, the configuration logic is further to receive a request to end service, disable the first device in the device-to-device data transfer based on the request to end service; and disable the second device in the device-to-device data transfer based on the request to end service.

In at least one example, the request to end service is received from a software application, where the software application also generated the service request.

In at least one example, the configuration logic is to determine whether a device-to-device data transfer between the first and second devices is a legal transaction from static configuration data maintained for devices in a system.

In at least one example, the configuration logic is to determine a type of transport for the device-to-device data transfer between the first and second devices from the configuration data.

In at least one example, the device-to-device transfer uses a common PCI-based transport layer supported by the first and second device.

In at least one example, the transport layer includes a plurality of modes, a respective subset of the modes supported by the first and second devices is determined from the configuration data, and the type of transport is determined based on the subsets of modes supported by the first and second devices.

In at least one example, the compatibility can be determined based on an identified service request.

In at least one example, identifying the first and second devices based on the service request includes identifying capabilities of each of the first and second devices and determining that the respective capabilities of the first and second devices enable use of the first and second devices in a device-to-device data transfer for the service request.

In at least one example, static configuration data can be accessed that is stored in memory to determine the compatibility of the first device with the second device for device-to-device data transfer.

In at least one example, the service request is a service request of a software application.

In at least one example, device-to-device data transfer includes a PCI-based device-to-device data transfer.

In at least one example, device-to-device data transfer includes a PCIe-based device-to-device data transfer.

In at least one example, the devices can be integrated blocks in an SOC.

One or more embodiments may provide an apparatus, a system, a machine readable storage, a machine readable medium, hardware- and/or software-based logic, and a method to implement communication using a defined interconnect, where the communication is implemented over a transaction layer of a PCI-based protocol stack and the communication is to forgo data link layer control data and physical layer control logic control data.

In at least one example, the defined interconnect includes a defined set of control signals.

In at least one example, the set of control signals includes a power gating signal that is to enable power gating control of a downstream device.

In at least one example, the set of control signals is to support posted-, non-posted, and completion-type packets.

In at least one example, each of the packets is to include a header and a payload.

In at least one example, the set of control signals defines a handshake.

In at least one example, the control signals defining the handshake include a hold signal and a valid signal.

In at least one example, the control signals include a hold header posted signal, a hold header nonposted signal, a hold header completion signal, a hold payload posted signal, a hold payload nonposted signal, a hold payload completion signal.

In at least one example, the control signals include a header posted valid signal, a header nonposted valid signal, a header completion valid signal, a payload posted valid signal, a payload nonposted valid signal, a payload completion valid signal.

In at least one example, hold signals, when asserted, are to indicate that data of a particular corresponding type is not to be sent to a device asserting the signal.

In at least one example, valid signals are to indicate that data of a particular corresponding type sent by the device asserting the signal is valid.

In at least one example, the first and second devices each include a respective integrated IP block.

In at least one example, the system includes a system on chip (SoC).

One or more embodiments may provide an apparatus, a system, a machine readable storage, a machine readable medium, hardware- and/or software-based logic, and a method to identify data identifying a set of devices to be included in an system on chip (SoC), acquire configuration metadata for each device in the set of devices, and determine configuration of devices in the SoC based on the configuration metadata.

In at least one example, determining the configuration of devices includes determining a physical layout of devices on the SoC based on the configuration metadata.

In at least one example, determining the configuration of devices includes determining clocking for the SoC based on the configuration metadata.

In at least one example, determining the configuration of devices includes determining compatibilities between respective devices in the set of devices.

In at least one example, the compatibilities are determined from compatibility tests performed between respective devices in the set of devices and the compatibility tests are performed using respective configuration metadata of the respective devices.

In at least one example, determining the configuration of devices includes determining capabilities of each devices in the set of devices.

In at least one example, the configuration metadata of each device includes a respective build collateral of each device.

In at least one example, static configuration information of the set of devices is determined to be persistently stored for access during configuration of the resulting SoC.

In at least one example, a respective source of configuration metadata for the device is identified and querying the respective source of the configuration metadata.

In at least one example, at least one of the sources includes a data server associated with provider of the respective device.

In at least one example, at least one of the sources includes a database storing configuration metadata for a plurality of different devices.

In at least one example, a configuration data structure is generated to describe the determined configuration of devices in the SoC.

In at least one example, the configuration data structure is a machine readable data structure.

In at least one example, the configuration data structure is adapted for use in determining a configuration of an operating system for the SoC.

In at least one example, the data identifying a set of devices to be included in an system on chip (SoC) is at least partially user-defined and configuration of devices in the SoC is determined without further user intervention.

In at least one example, the configuration metadata is machine-readable and is structured according to a defined template.

In at least one example, a configuration of an operating system is determined for the SoC from the configuration of devices in the SoC determined from the configuration metadata.

In at least one example, the configuration metadata is according to a defined template.

In at least one example, a stitcher tool is provided that can read the configuration metadata to determine configuration attributes for each device in the set of devices. The stitcher tool can query a plurality of sources to acquire the configuration metadata. The stitcher tool can determine an interconnect fabric for the SoC.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    an integrated circuit comprising a processing element and a plurality of intellectual property (IP) blocks;
    persistent storage to hold a data structure comprising a first subset of configuration parameters, wherein the first subset of configuration parameters are defined prior to runtime for at least a first one of the plurality of IP blocks, and the configuration parameters comprise parameters for the plurality of IP blocks defined according to a Peripheral Component Interconnect (PCI)-based protocol;
    one or more registers, accessible through a Basic I/O System (BIOS), to store a second subset of the configuration parameters, wherein the persistent storage is directly accessible by an operating system to be executed by the processing element, and the one or more registers comprise registers based on the Peripheral Component Interconnect (PCI)-based protocol;
    an interconnect fabric to interconnect components of the integrated circuit, wherein the operating system is to receive the second subset of configuration parameters from the BIOS and is to access the first subset of configuration parameters directly from persistent storage, and the operating system is to configure at least a portion of the interconnect fabric based on the first and second subsets of configuration parameters.

2. The apparatus of claim 1, wherein the first set of configuration parameters are based on metadata maintained for at least a portion of the plurality of IP blocks.

3. The apparatus of claim 1, wherein at least some of the first set of configuration parameters are defined at build time of the integrated circuit.

4. The apparatus of claim 1, wherein the registers comprise one or more of status registers and configuration registers.

5. The apparatus of claim 1, wherein the persistent memory comprises system memory and the data structure is stored in system memory.

6. The apparatus of claim 1, wherein the integrated circuit comprises a system on chip.

7. At least one machine accessible storage medium having code stored thereon, the code when executed on a machine, causes the machine to:
    access a data structure directly from system memory, wherein the data structure holds a first subset of configuration parameters of intellectual property (IP) blocks in an integrated circuit device, wherein the configuration parameters of the IP blocks comprise parameters defined according to a Peripheral Component Interconnect (PCI)-based protocol;
    access a second subset of the configuration parameters stored in one or more registers through a Basic I/O System (BIOS) associated with the integrated circuit device, wherein the one or more registers are separate from the data structure; and
    configure one or more of the integrated blocks based on corresponding configuration information in the first and second subsets of the configuration parameters,
    wherein the first subset of the configuration parameters are set prior to runtime and are to be persistently stored in the data structure and at least a portion of the second subset of the configuration parameters are to be defined at runtime.

8. The storage medium of claim 7, wherein the first subset of the configuration parameters are based on metadata maintained for the one or more integrated blocks.

9. The storage medium of claim 7, wherein at least some of the first subset of the configuration parameters are defined at build time of the integrated circuit device.

10. The storage medium of claim 7, wherein at least a portion of the first subset of the configuration parameters defined in the data structure comprise Peripheral Component Interconnect (PCI) Express (PCIe) capabilities.

11. The storage medium of claim 7, wherein the first subset of the configuration parameters include transport modes supported by the respective device, wherein the transport modes comprise modes in a defined transport layer.

12. The storage medium of claim 7, wherein the data structure identifies, for at least one of the IP blocks, the respective PCI class, subclass, and programming interface of the integrated block.

13. The storage medium of claim 7, wherein the portion of the second subset of the configuration parameters are populated at runtime based on configuration information defined in the data structure.

14. A method comprising:
    accessing, from a persistent data structure in system memory using an operating system, a first set of configuration parameters, wherein the first set of configuration parameters is defined in the data structure prior to runtime of a system, the first set of configuration parameters comprise configuration parameters for at least a portion of a plurality of intellectual property (IP) blocks in a system-on-chip (SoC) device;
    accessing, from one or more registers using a Basic I/O System (BIOS), a second set of configuration parameters, wherein the one or more registers are separate from the data structure;
    passing the second subset of configuration parameters to the operating system from the BIOS; and
    configuring the plurality of IP blocks based on the first and second sets of configuration parameters, wherein each of the first and second sets of configuration parameters comprise parameters defined according to a Peripheral Component Interconnect (PCI)-based protocol.

15. The method of claim 14, wherein the second set of configuration parameters are discovered at runtime.

16. The method of claim 14, wherein the configuring is performed by the operating system.

17. The method of claim 14, wherein the one or more registers are linked to the data structure and the second set of configuration parameters are generated at runtime based on configuration information defined in the data structure, the method further comprising changing a particular one of the configuration parameters defined in the data structure, wherein a particular register value is updated to reflect the change to the particular configuration parameter based on a link between the particular register value and the data structure.

18. A system comprising:
   at least one data processor;
   a plurality of intellectual property (IP) blocks co-packaged with the data processor;
   an interconnect fabric to interconnect components comprising the data processor and at least a subset of the plurality of IP blocks;
   memory, directly accessible by an operating system, wherein the memory stores a data structure populated with a first set of configuration parameters of one or more of the plurality of devices, wherein the first set of configuration parameters are persistently defined and comprise parameters defined according to a Peripheral Component Interconnect (PCI)-based protocol;
   one or more registers to be populated with a second set of configuration parameters, wherein the second set of configuration parameters comprise parameters defined according to the PCI-based protocol; and
   an operating system to:
      access the data structure to identify the first set of configuration parameters from the data structure;
      receive the second set of configuration parameters from a Basic I/O System (BIOS), wherein the BIOS is to access the second set of configuration parameters from the one or more registers; and
      configure the interconnect fabric based on corresponding information defined in the first and second sets of configuration parameters.

19. The system of claim 18, wherein the PCI-based protocol comprises a PCI Express (PCIe)-based protocol.

20. The system of claim 18, wherein the one or more registers comprise at least one of a capability register or a status register defined according to the PCI-based protocol.

21. The system of claim 18, wherein the system comprises a system-on-chip.

* * * * *